US006292282B1

(12) United States Patent
Mossberg et al.

(10) Patent No.: US 6,292,282 B1
(45) Date of Patent: Sep. 18, 2001

(54) TIME-WAVELENGTH MULTIPLE ACCESS OPTICAL COMMUNICATION SYSTEMS AND METHODS

(75) Inventors: Thomas Mossberg; Anders Grunnet-Jepsen; John N. Sweetser; Michael Munroe, all of Eugene, OR (US)

(73) Assignee: Templex Technology, Inc., San Jose, CA (US)

(*) Notice: Subject to any disclaimer, the term of this patent is extended or adjusted under 35 U.S.C. 154(b) by 0 days.

(21) Appl. No.: 09/354,851

(22) Filed: Jul. 16, 1999

Related U.S. Application Data

(60) Provisional application No. 60/095,992, filed on Aug. 10, 1998, and provisional application No. 60/119,464, filed on Feb. 10, 1999.

(51) Int. Cl.[7] .............................. H04J 4/00; H04J 14/08; H04J 14/02; H04B 10/12

(52) U.S. Cl. ..................... 359/123; 359/135; 359/124; 359/127; 359/140; 359/138; 359/173

(58) Field of Search .................................. 359/135, 138, 359/140, 137, 123; 385/24

(56) References Cited

U.S. PATENT DOCUMENTS

| | | |
|---|---|---|
| 4,866,699 | 9/1989 | Brackett et al. . |
| 5,073,980 | 12/1991 | Prucnal et al. . |
| 5,136,666 | 8/1992 | Anderson et al. . |
| 5,351,147 | 9/1994 | Frenkel . |
| 5,473,719 | * 12/1995 | Stone ..................................... 385/123 |
| 5,568,301 | 10/1996 | Tiemann et al. . |
| 5,579,105 | * 11/1996 | Belton et al. ........................ 356/310 |
| 5,600,466 | 2/1997 | Tsushima et al. . |

(List continued on next page.)

OTHER PUBLICATIONS

E. Marom, "Optical Delay Line Matched Filters," *IEEE Trans. Circ. Syst. CAS* 25:360–364 (1978).
R.M. Gagliardi et al., "Fiber–Optic Digital Video Multiplexing Using Optical CDMA," *J. Lightwave Technol.* 11:20–26 (1993).
N. Vethanayagam and R.I. MacDonald, "Demonstration of a Novel Optical Code–Division Multiple–Access System at 800 Megachips Per Second," *Opt. Lett.* 16:1010–1012 (1991).
M.E. Marhic, "Coherent Optical CDMA Networks," *J. Lightwave Technol.* 11:854–864 (1993).
L.R. Chen et al., "Ultrashort Pulse Propagation in Multiple–Grating Fiber Structures," *Opt. Lett.* 22:402–404 (1997).

Primary Examiner—Jason Chan
Assistant Examiner—M. R. Sedighian
(74) *Attorney, Agent, or Firm*—Klarquist Sparkman Campbell Leigh & Whinston LLP

(57) ABSTRACT

Methods and apparatus for optical communication are disclosed. An optical data stream is encoded to produce an optical data stream having a predetermined time-wavelength spectrum. Two or more encoded data streams are combined in a transmission medium (e.g., optical fiber) and the combined data stream is decoded with decoders corresponding to the encoding of the data streams, producing decoded outputs. The decoded outputs include a portion corresponding to a selected data stream as well as a portion corresponding to unselected data streams (crosstalk). A nonlinear detector receives the decoded outputs and rejects crosstalk. Coders produce temporal delays and phase shifts specified by a time-wavelength code for, the spectral components of an input optical signal. Some coders convert optical signals encoded with a first time-wavelength code into an output corresponding to a second time-wavelength code. Temporal delays and phase shifts can be selected to compensate for dispersion in a transmission medium. Coherent coders are provided in which the phase shifts produced on the spectral components of an optical signal are controlled within about one half of the wavelength of the spectral component.

16 Claims, 17 Drawing Sheets

U.S. PATENT DOCUMENTS

| | | |
|---|---|---|
| 5,737,106 * | 4/1998 | Sanaonetti et al. .................. 359/140 |
| 5,745,615 * | 4/1998 | Atkins et al. .......................... 385/37 |
| 5,757,487 * | 5/1998 | Kersey ................................. 356/345 |
| 5,760,941 | 6/1998 | Young et al. . |
| 5,761,351 | 6/1998 | Johnson . |
| 5,778,119 * | 7/1998 | Farries .................................... 385/37 |
| 5,793,907 | 8/1998 | Jalali et al. . |
| 5,796,502 | 8/1998 | Haller, Jr. . |
| 5,907,421 * | 5/1999 | Warren et al. ....................... 359/180 |

* cited by examiner

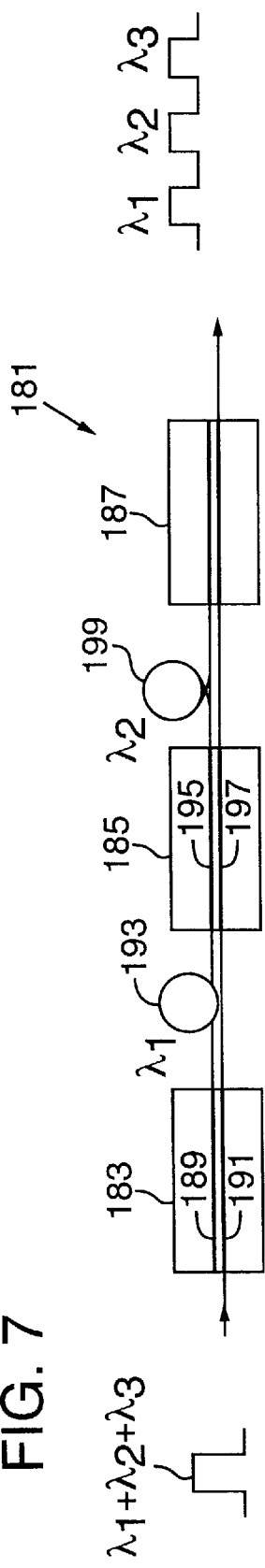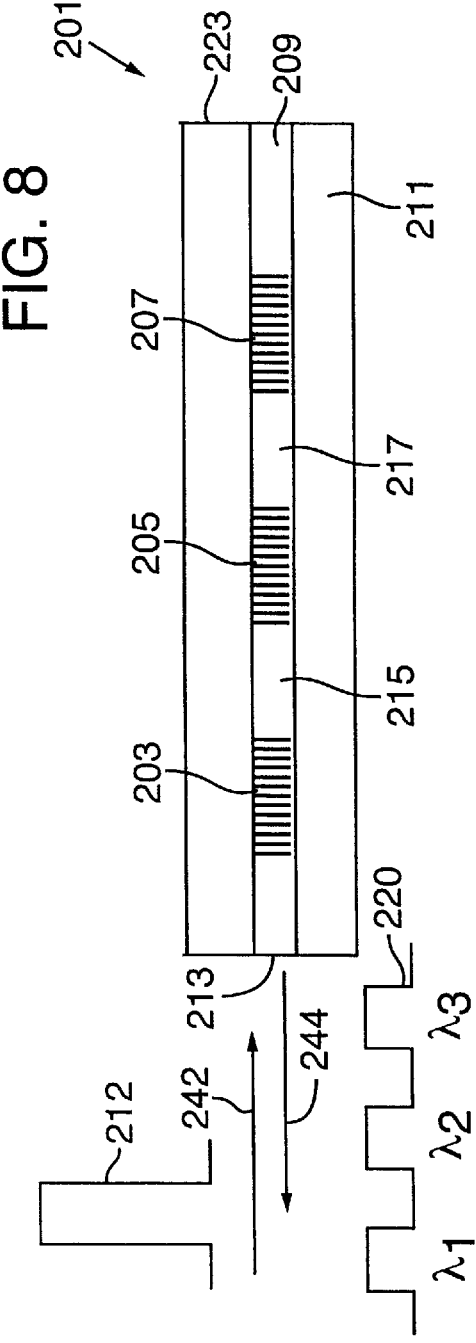

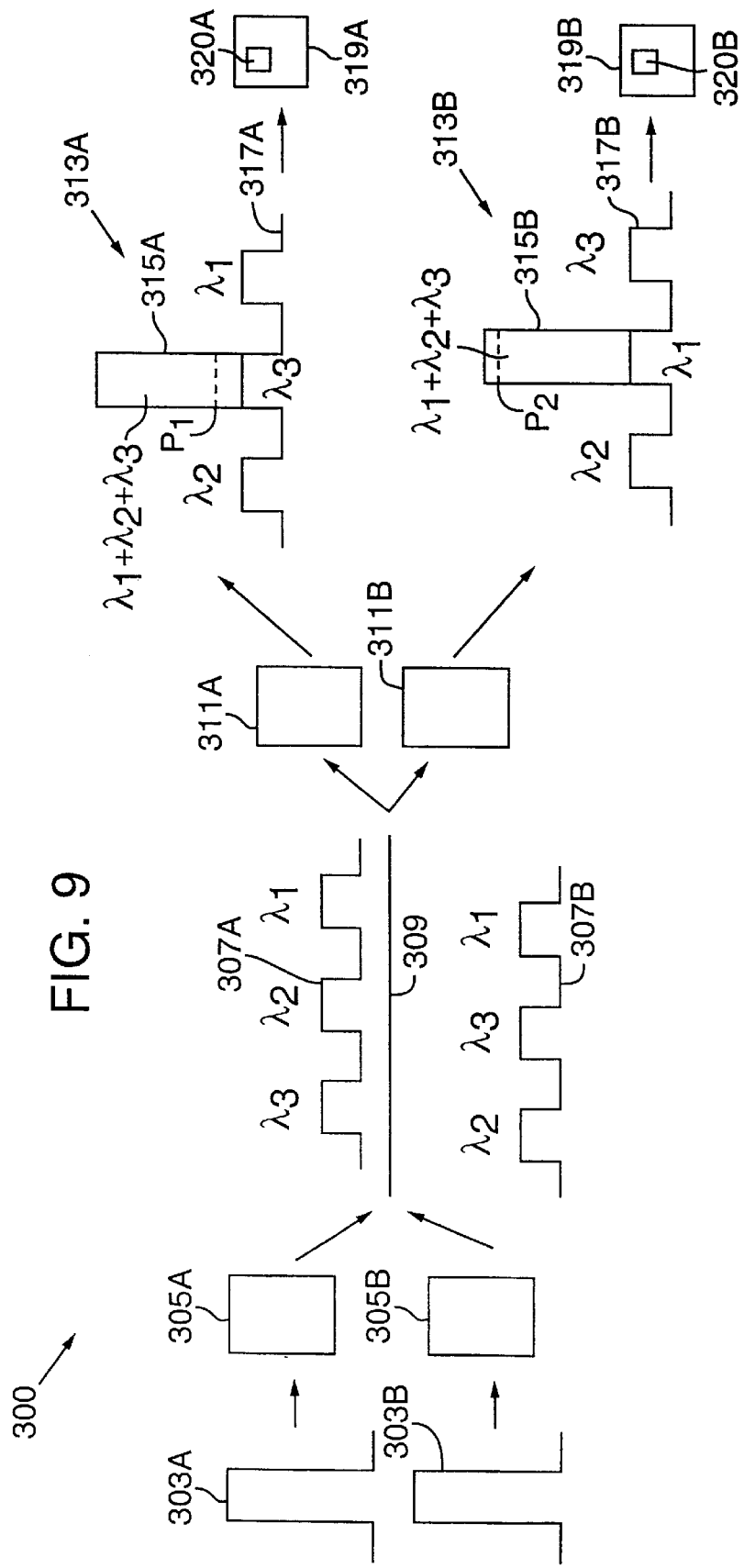

Matched decoded coherent pulse
Encoder Code
$[\lambda_4, \lambda_5, \lambda_1, \lambda_3, \lambda_2]$
Decoder Code
$[\lambda_2, \lambda_3, \lambda_1, \lambda_5, \lambda_4]$ Unmatched decoded pulse
Encoder Code
$[\lambda_4,\lambda_5,\lambda_1,\lambda_3,\lambda_2]$
Decoder Code
$[\lambda_4,\lambda_3,\lambda_5,\lambda_1,\lambda_2]$

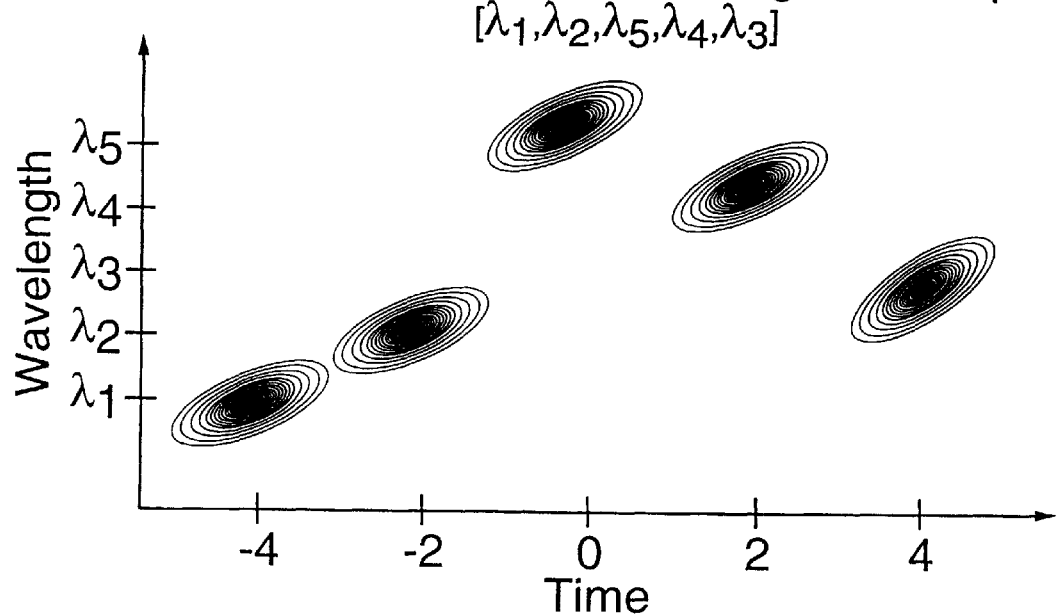

TIME-WAVELENGTH MULTIPLE ACCESS OPTICAL COMMUNICATION SYSTEMS AND METHODS

This application claims benefit of Provisional Nos. 60/095,992 filed Aug. 10, 1998 and 60/119,464 filed Feb. 10, 1999.

FIELD OF THE INVENTION

The invention pertains to methods and apparatus for optical communication.

BACKGROUND OF THE INVENTION

The communication bandwidths available with optical fibers are very large, generally many terahertz (THz). Unfortunately, this bandwidth is too large to be effectively used by a single amplitude-modulated data channel in a practical communication system. Many factors limit the practical use of this bandwidth. These factors include limitations on the modulation rates achievable with conventional electronic devices as well as the high cost of high-bandwidth optical components such as modulators and detectors. In some communication systems, fiber dispersion limits the useful fiber bandwidth.

Methods for using more of the available fiber bandwidth include several multiplexing methods that permit data transmission at rates exceeding the rates possible for a single amplitude modulated channel. These methods include time-division multiplexing (TDM), wavelength-division multiplexing (WDM), and optical code-division multiple access (OCDMA). Each of these approaches has significant limitations. In TDM, data from one or more data streams is assigned to selected time slots so that each data stream uses a portion of the fiber bandwidth. TDM allows aggregation of data streams from many users, but does not increase the data rate available to a single data stream. Some examples of TDM systems include commercial communication systems that conform to the synchronous optical network (SONET) standard or the synchronous digital hierarchy (SDH) standard.

Wavelength-division multiplexed (WDM) systems and dense WDM (DWDM) systems transmit data using multiple spectrally displaced narrow-band optical carriers (wavelengths), and each wavelength is temporally encoded. The time-coding is typically a relatively simple amplitude modulation scheme and thus the bandwidth of each wavelength channel is set by limits similar to those of non-WDM systems. WDM systems normally require multiple laser sources, one for each wavelength channel. The number of wavelength channels that can be multiplexed in a single fiber is limited by the spectral channel separation required to compensate for variations in laser wavelength as well as other factors such as the gain bandwidth of optical amplifiers. The available maximum bandwidth is limited by the number of wavelength channels and the per-channel data rate. The spectral channel separations and per-channel data rates of many WDM systems leave significant portions of the fiber bandwidth unused, and higher data rates are theoretically possible.

OCDMA uses coded data bits whose spectrum exceeds the data transmission rate and spans a spectral window. Multiple approaches to the realization of OCDMA have been proposed. Unfortunately, implementation of OCDMA can be difficult and expensive, and improved methods are needed to take advantage of the full bandwidth of optical fibers.

SUMMARY OF THE INVENTION

The present invention provides, inter alia, optical communication methods and apparatus that use time-wavelength (TW) codes.

According to a first aspect of the invention, time-wavelength coders (encoders and decoders) are provided that receive input optical signals having a first predetermined time-wavelength spectrum and generate an output signal having a second predetermined time-wavelength spectrum. The first and second predetermined time-wavelength spectra include a plurality of spectral components. The coders provide optical paths for corresponding spectral components of the input optical signals and the path lengths of the optical paths are determined by time-wavelength codes.

In an illustrative embodiment, a coder comprises an optical fiber that includes a plurality of fiber Bragg gratings defined by spatial variations of an optical property of the fiber. The spatial variations provide predetermined time delays and phase differences for the spectral components. Coherent coders are provided in which the phase differences for the spectral components are predetermined to within about one-half of a wavelength of the associated spectral component. The spatial variations in the optical property of the fiber include variations in at least one of amplitude, spatial period, and spatial phase of the optical property. The Bragg grating can be defined by refractive-index variations, and the refractive-index variations can be in the fiber core, the fiber cladding, or in a coating on the fiber cladding.

In another representative embodiment, a coder comprises a plurality of optical paths corresponding to spectral components of an input, the optical paths having path lengths selected to produce predetermined delays (and phase shifts) for the spectral components. A beam divider directs the spectral components along the respective optical path and a beam combiner recombines the spectral components after propagation along respective optical paths. In some embodiments, the path lengths are predetermined by a time-wavelength code. For a coherent coder, the path lengths and phase shifts are predetermined to significantly less than $\lambda/2$, wherein $\lambda$ is a wavelength of the spectral component received by a respective optical path. In other embodiments, the path lengths are selected to compensate for dispersion in a transmission medium such as an optical fiber or to convert an optical input coded with a first code into an output corresponding to a second code.

In another representative embodiment, an encoder is provided that receives a Fourier-transform-limited optical input and produces at least two Fourier-transform-limited spectral components. These spectral components have bandwidths less than or equal to the bandwidth of the optical input and durations longer than the duration of the optical input.

According to another aspect of the invention, transmitters for an optical communication system are provided. A representative embodiment of such a transmitter comprises a light source that is modulated in response to a data stream, the light source comprising a plurality of spectral components. A time-wavelength encoder receives the modulated optical signal and produces an output signal having a predetermined time-wavelength spectrum.

According to another aspect of the invention, optical receivers are provided for detecting an optical signal having a time-wavelength spectrum determined by a time-wavelength code. A representative embodiment includes a time-wavelength encoder that receives the optical signal and modifies the time-wavelength spectrum of the optical signal. A photodetector receives the optical signal from the encoder and converts the optical signal into an electrical signal.

According to yet another aspect of the invention, optical communication systems arm provided. A representative embodiment includes a first and a second series of optical pulses corresponding to a first and a second data stream. A first encoder receives the first series of optical pulses and produces a first coded output having a time-wavelength spectrum determined by a first time-wavelength code. A second encoder receives the second series of optical pulses and produces a second coded output having a time-wavelength spectrum determined by a second time-wavelength code. A combiner receives and combines the first and second coded outputs. A divider receives the combined first and second coded outputs and produces a first output and a second output that are delivered to first and second decoders, respectively.

According to yet another aspect of the invention, methods are provided for multiplexing a first optical data stream and a second optical data stream, the first and second optical data streams having respective time-wavelength spectra. Time-wavelength codes are selected for encoding and decoding the first and second data streams and the time-dependent spectra of the first and second optical data streams are transformed according to the selected time-wavelength codes. The data streams are combined and transmitted in a transmission medium. The combined optical data streams are received and divided into a first portion and a second portion that are decoded with the selected decoding codes. The first and second portions include contributions from both the first data stream and the second data stream and each portion is nonlinearly detected to reject crosstalk. In a representative embodiment, either the encoding codes or the decoding codes, or both, are selected to compensate for dispersion in the transmission medium.

According to still another aspect of the invention, a code converter is provided that accepts optical signals having a first time-wavelength spectrum and produces output signals having a second time-wavelength spectrum.

BRIEF DESCRIPTION OF THE DRAWINGS

FIG. 7 is a schematic of an alternative encoder using wavelength-dependent couplers.

FIG. 8 is a schematic of an alternative encoder that includes grating segments formed in an optical fiber.

FIG. 9 is a schematic of a two-channel time-wavelength multiple access communication system.

FIG. 15D shows the time-wavelength spectrum of the chirped pulse of FIG. 15A after encoding with a time-wavelength code.

DETAILED DESCRIPTION

Figure 1:
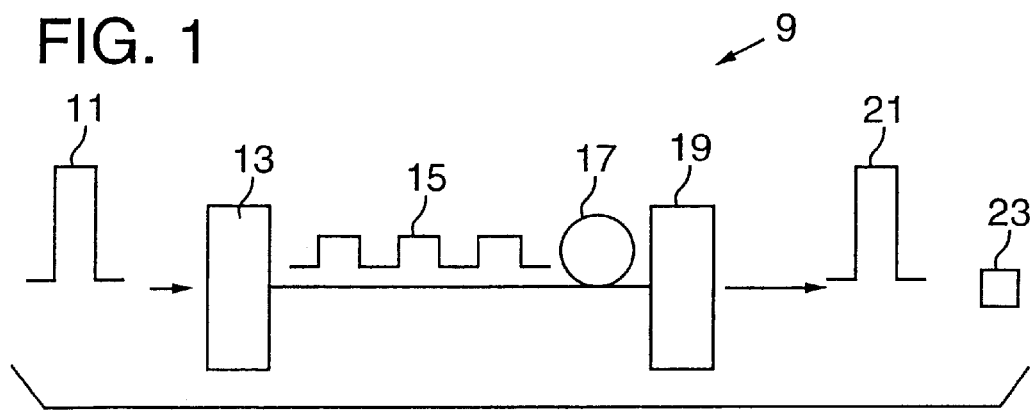
FIG. 1 is a schematic of a time-wavelength multiple access communication system.

Methods and apparatus are disclosed for optical time-wavelength multiple access (TWMA) communication. In optical TWMA communication, communication channels are distinguished by encoding an input optical signal according to a predetermined code to produce a coded output. The coded output has a time-wavelength spectrum (TWS) determined by the code and the TWS of the input optical signal, wherein a time-wavelength spectrum (TWS) is defined as the power per unit wavelength of an optical signal as a function of both time and wavelength (or frequency). If the input optical signal is a pulse, the coded output is typically a series of pulses, each pulse corresponding to a spectral component of the input optical signal. The coded output can be decoded according to a matched code to transform the decoded output into an output having a TWS similar to that of the input optical signal, a TWS selected for dispersion compensation or code conversion as discussed below, or other predetermined TWS.

Some embodiments of TWMA communication systems include sets of time-wavelength (TW) codes for encoding and decoding each of a plurality of data streams. The codes for encoding and decoding a selected data stream are referred to as "matched" and produce a predetermined ("matched") output. In one example, coding and decoding with matched codes produce a decoded output that is substantially similar to a non-encoded input. Codes for encoding and decoding different data streams are unmatched, and generally produce an output having a relatively long duration in comparison with the non-encoded input. The unmatched portion of a decoded output is referred to as "crosstalk." Matched decoding of a selected data stream is accompanied by unmatched decoding of another data stream, producing a matched output and crosstalk. Time-wavelength codes are conveniently chosen with a computer search of randomly selected codes (or all codes) to identify codes having characteristics falling within chosen bounds such as codes having low crosstalk. In some cases, codes are selected to compensate dispersion in a transmission medium or to transform a coded output produced with a first code into a coded output corresponding to a second code.

An encoder and decoder are generally referred to as "matched" if the relative delays imparted to the spectral components are equal and opposite, or if the total delays are substantially the same for all spectral components after decoding. In addition, an encoder and decoder are referred to as matched if the relative delays are matched, inclusive of transports medium delays. If an encoder produces relative delays $\phi_1, \phi_2, \ldots, \phi_n$ in spectral components $\lambda_1, \lambda_2, \ldots, \lambda_n$, respectively, as defined by a first code, then the matched decoder produces relative delays $-\phi_1, -\phi_2, \ldots, -\phi_n$. Alternatively, if a code is represented as a transfer function $\Psi=\exp[-j\phi_i(\lambda_i)]$, where $j=(-1)^{1/2}$, then the transfer function of the matched code is the complex conjugate, i.e., $\Psi^*=\exp[j\phi_i(\lambda_i)]$. As noted previously, in some cases an encoder and decoder are matched to compensate for dispersion or other propagation effects in order to produce a short pulse or other selected output. For example, if a transmission medium such as a fiber imposes relative delays $\theta_1, \ldots, \theta_n$ on spectral components $\lambda_1, \lambda_2, \ldots, \lambda_n$ that are represented as $X=\exp[-j\theta_i(\lambda_i)]$, then the transfer functions of the encoder code can be modified to $\Psi X^*$ or that of the decoder code can be modified to $\Psi^* X^*$. Alternatively, both the encoder and decoder codes can be modified to include portions of the necessary correction,.

In a TWMA communication system, optical signals are encoded by redistributing optical power in time, or wavelength, or both time and wavelength. The redistribution is specified with time-wavelength (TW) codes. For convenience in describing TW coding, an optical pulse or other optical signal is divided into "time chips" and "wavelength chips" (spectral components) that are defined as portions of the optical signal within a specified time interval or wavelength interval, respectively. A time-wavelength (TW) chip is an interval in time and wavelength that is a product of the time and wavelength intervals of corresponding time and wavelength chips. In a graph of a TWS of an optical signal, a time-wavelength chip is represented by an area bounded by corresponding time and wavelength chips. In some cases, the area of a time-wavelength chip is selected to be about $\lambda^2/c$, where $\lambda$ is the chip wavelength, and c is the vacuum speed of light. A time-wavelength chip of such area represents a "Fourier-transform-limited optical pulse." Time-wavelength chips of larger area are also useful and, if necessary, can be described as aggregations of time-wavelength chips having the transform-limited area $\lambda^2/c$.

An optical signal is characterized by a time-bandwidth product that is defined as a product of a spectral width $\Delta\lambda$ and a temporal duration $\Delta t$ of the optical signal. The spectral width and temporal duration are defined by, for example, a spectral wavelength and temporal full-width at half maximum of the TWS of the optical signal. The TWS of an optical signal having a large time-bandwidth product, i.e., $\Delta\lambda\Delta t >> \lambda^2/c$, can be more complex than that of optical signals for which the time-bandwidth product is small, i.e., $\Delta\lambda\Delta t \approx \lambda^2/c$. If the time-bandwidth product $\Delta t\Delta\lambda$ is approximately $\lambda^2/c$, then the optical signal is referred to as "transform limited," and selecting an optical power as a function of time (or wavelength) permits estimation of the dependence of the power of the optical signal on wavelength (time).

In some embodiments, a coded optical signal is decoded such that the spectral components of the optical signal are recombined with interferometric accuracy, i.e., so that the relative delays (phase shifts) of the spectral components after encoding and decoding are predetermined to significantly less than $\lambda/2$, wherein $\lambda$ is an average wavelength of the optical signal. Encoders, decoders, and communication systems that maintain such interferometric accuracy are referred to as "coherent," while those that do not are referred to as "incoherent." For convenience, encoders and decoders are both referred to as "coders."

FIG. 1 illustrates an example TWMA communication system according to the invention. An input optical pulse 11 is directed to an encoder 13, producing a coded output 15. An optical fiber 17 or other optical transmission medium transmits the coded output 15 to a decoder 19. The decoder 19 transforms the coded output 15 into an output pulse 21 that is directed to a detector 23.

Figure 2:
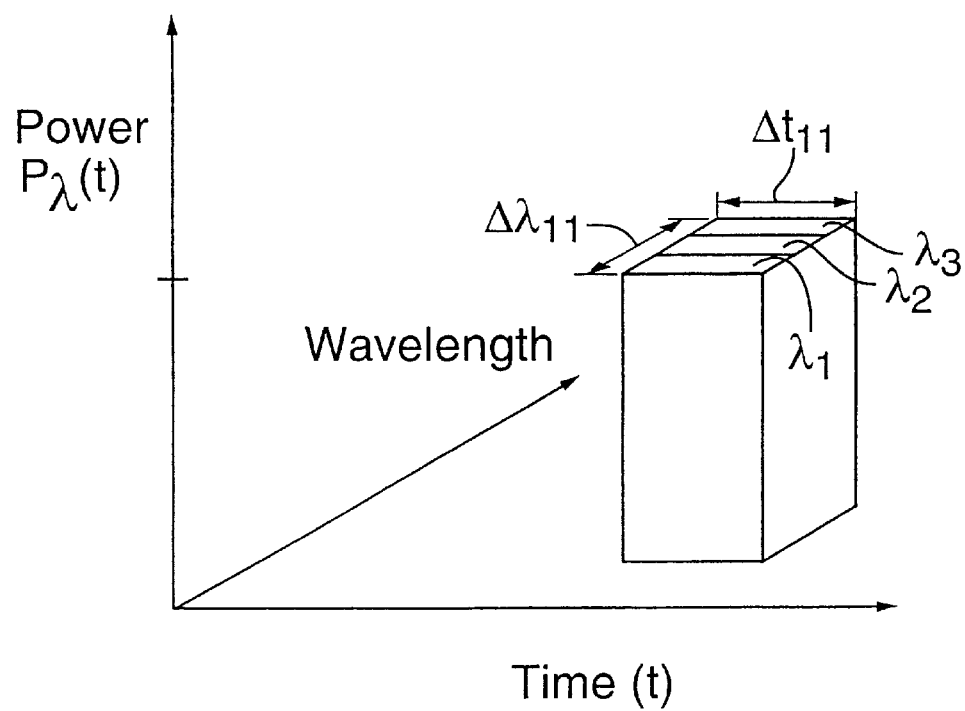
FIG. 2 is a graph of power as a function of time and wavelength for an input pulse to the communication system of FIG. 1.

FIG. 2 illustrates power of the input optical pulse 11 as a function of wavelength and time. As shown in FIG. 2, the input optical pulse 11 has a constant spectral power density $P_\lambda(t)$ during a time interval $\Delta t_{11}$ and a constant spectral width $\Delta\lambda_{11}$ during the time interval $\Delta t_{11}$. The total power of the input optical pulse 11 is $P=P_\lambda\Delta\lambda_{11}$. The input pulse 11 is selected for purpose of illustration and is a non-Fourier-transform-limited pulse. In some examples discussed below, Fourier-transform-limited pulses are used.

Figure 3:
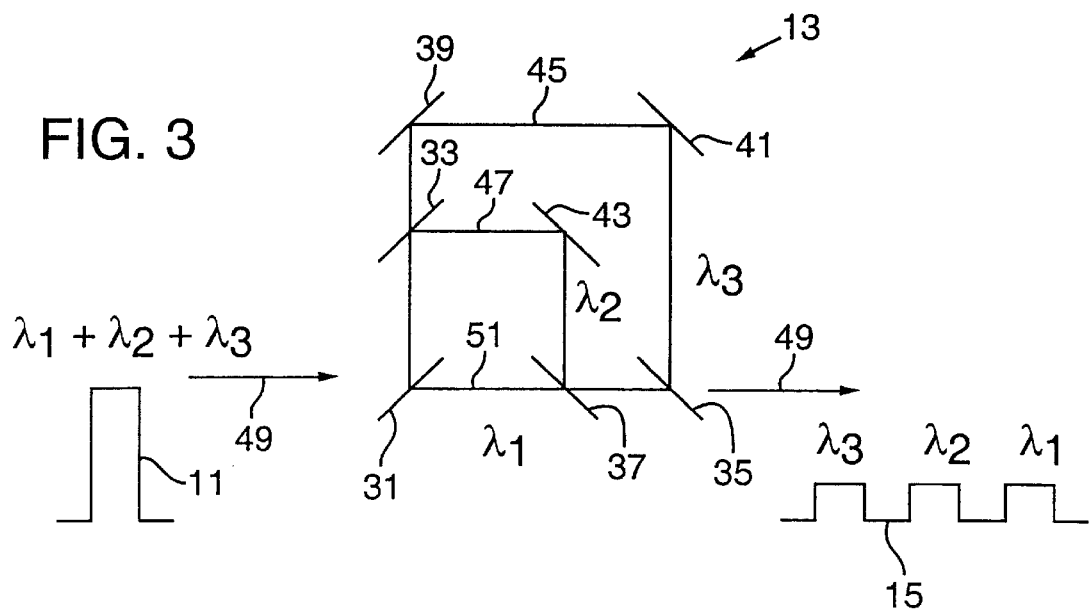
FIG. 3 is a schematic of the encoder of the communication system of FIG. 1.

The encoder 13 divides the input optical pulse 11 into three spectral components, $\lambda_1, \lambda_2, \lambda_3$, each having a spectral width $\Delta\lambda_{11}/3$ and a temporal duration $\Delta t_{11}$. Other divisions of the input optical pulse 11 into spectral components are possible, including divisions into spectral components of unequal spectral width or total energy. Referring to FIG. 3, the encoder 13 includes reflectors 39, 41, 43 and dichroic reflectors 31, 33, 35, 37. The dichroic reflectors 31, 35, and reflectors 39, 41 define an optical path 45 for the spectral component $\lambda_3$. The dichroic reflectors 31, 33, 37 and the reflector 43 define an optical path 47 for the spectral component $\lambda_2$. The dichroic reflectors 31, 37, 35 transmit the spectral component $\lambda_1$ along an axis 49 defining an optical path 51.

The dichroic reflector 31 receives the input optical pulse 11 and reflects the spectral components $\lambda_2, \lambda_3$ to the dichroic reflector 33 that reflects the spectral component $\lambda_2$ and transmits the spectral component $\lambda_3$ to the reflector 39. The reflectors 39, 41 reflect the spectral component $\lambda_3$ to the dichroic reflector 35 that reflects the spectral component $\lambda_3$ so that the spectral component $\lambda_3$ propagates along the optical path 51. After reflection by the dichroic reflector 33, the spectral component $\lambda_2$ reflected by the reflector 43 and the dichroic reflector 37 propagate along the optical path 51. Table 1 summarizes the properties of the dichroic reflector 31, 33, 35, 37.

TABLE 1

| Dichroic reflector | Spectral Component | | |
|---|---|---|---|
| | $\lambda_1$ | $\lambda_2$ | $\lambda_3$ |
| 31 | T | R | R |
| 33 | — | R | T |
| 35 | T | T | R |
| 37 | T | R | — |

In Table 1, "R" denotes high reflectivity and "T" denotes high transmittance. Values denoted by "–" need not be specified for the operation of the encoder 13.

The optical paths 45, 47, 51 impart delays to the spectral components $\lambda_3, \lambda_2, \lambda_1$, respectively, producing the coded output 15 from the input optical pulse 11. The spectral components $\lambda_1, \lambda_2, \lambda_3$ enter the encoder 13 together but exit at different times. The spectral component $\lambda_1$ exits the encoder 13 first, followed by the spectral components $\lambda_2, \lambda_3$. The relative delays of the spectral components $\lambda_1, \lambda_2, \lambda_3$ are set by the lengths of the optical paths 51, 47, 45.

Figure 4:
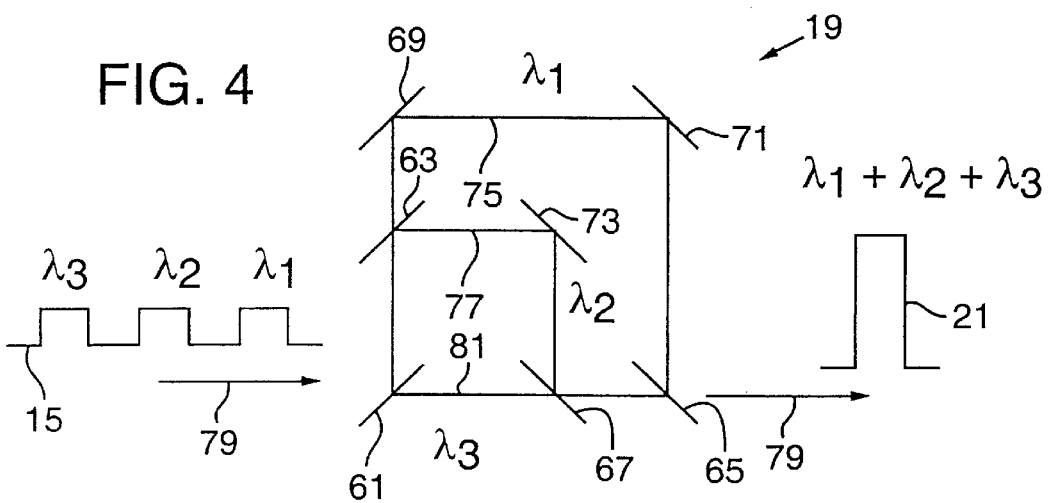
FIG. 4 is a schematic of a decoder of the communication system of FIG. 1.

The decoder 19 receives the coded output 15 (the delayed spectral components $\lambda_1, \lambda_2, \lambda_3$) after transmission through the optical fiber 17. FIG. 4 illustrates the decoder 19. The decoder 19 includes dichroic reflectors 61, 63, 65, 67 and reflectors 69, 71, 73 that define optical paths 75, 77, 81 for the spectral components $\lambda_1, \lambda_2, \lambda_3$, respectively. The lengths of the optical paths 75, 77, 81 are selected to reassemble the spectral components $\lambda_1, \lambda_2, \lambda_3$ into the output pulse 21 that propagates along an axis 79. The sum of the path lengths in the encoder 13 and in the decoder 19 for the spectral components $\lambda_1, \lambda_2, \lambda_3$ are selected so that the total optical path lengths are substantially equal for the three spectral components $\lambda_1, \lambda_2, \lambda_3$. The total path lengths can also be selected to compensate for relative delays among the spectral components $\lambda_1, \lambda_2, \lambda_3$ produced in the optical fiber 17 by dispersion.

Figure 5:
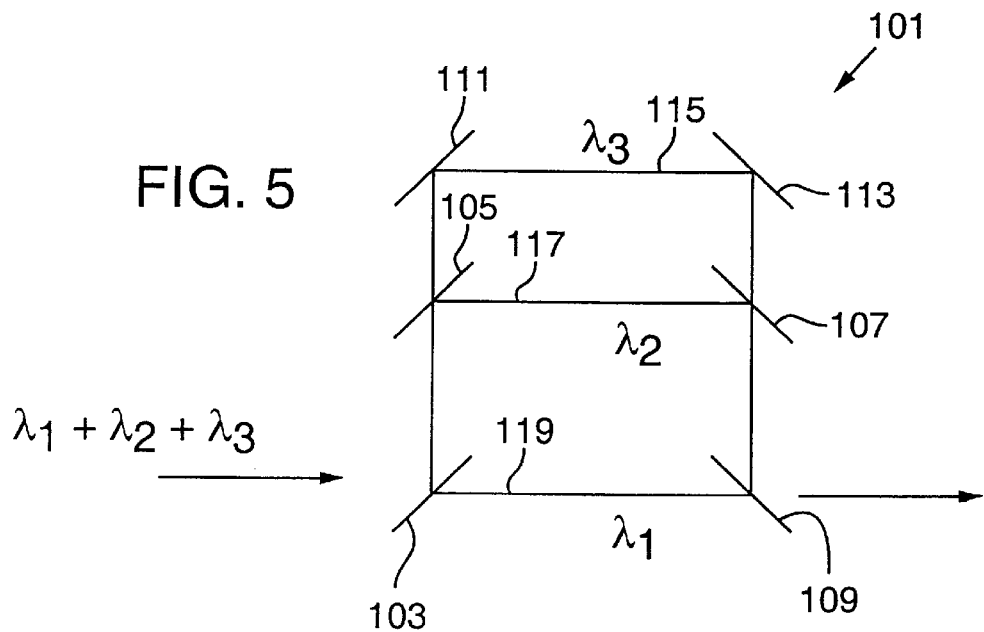
FIG. 5 is a schematic of an alternative encoder.
Figure 6:
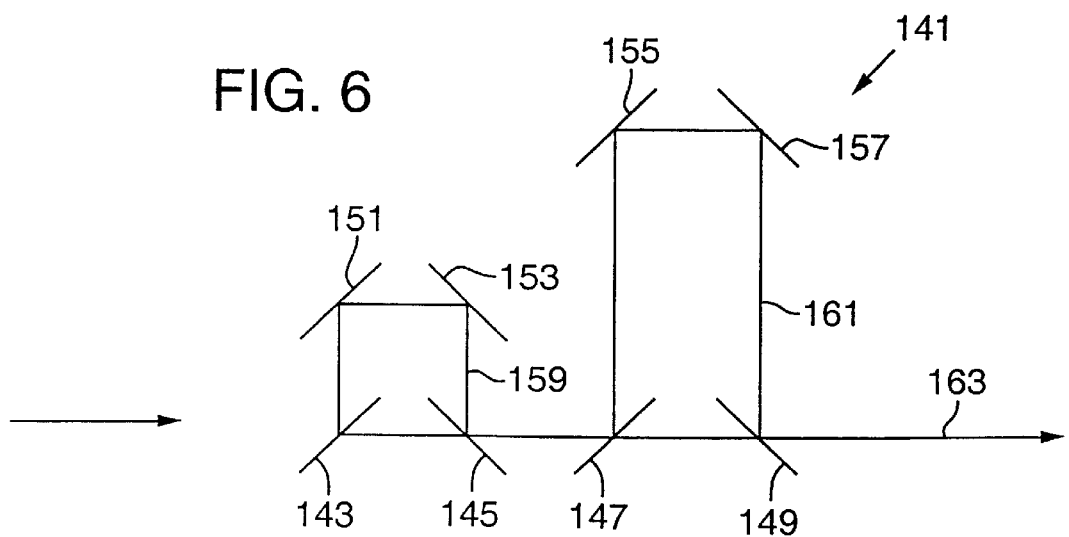
FIG. 6 is a schematic of an alternative encoder.

FIGS. 5–6 illustrate additional encoder/decoder configurations. Referring to FIG. 5, an encoder 101 includes dichroic reflectors 103, 105, 107, 109 and reflectors 111, 113. The dichroic reflectors 103, 105, 107, 109 define an optical path 117 for the spectral component $\lambda_2$, the dichroic reflectors 103, 105, 107, 109, and the reflectors 111, 113 define an optical path 115 for the spectral component $\lambda_3$. The spectral component $\lambda_3$, propagates through the dichroic reflectors 103, 109 along an optical path 119. The optical paths 115, 117, 119 delay the spectral components to produce the coded output 15. The configuration of the encoder 101 can be modified to produce a decoder by selecting optical paths to reassemble a coded output.

FIG. 6 illustrates an encoder 141 that includes dichroic reflectors 143, 145, 147, 149 and reflectors 151, 153, 155, 157. The dichroic reflectors 143, 145 and the reflectors 151, 153 define an optical path 159; the dichroic reflectors 147, 149 and the reflectors 155, 157 define an optical path 161, and a through optical path 163 is defined by transmission through the dichroic reflectors 143, 145, 147, 149. The dichroic reflectors 143, 145, 147, 149 can be configured to produce the coded output 15 of FIG. 4 or configured to produce other coded outputs.

The encoders 101, 141 of FIGS. 5–6, respectively, are selected as illustrative examples. The delays between the spectral components $\lambda_1, \lambda_2, \lambda_3$ in these encoders are multiples of a common delay, but unequal delays can be accommodated. In addition, encoders and decoders can use two or more spectral components and the spectral components need not be contiguous. The dichroic reflectors can be multilayer mirrors, diffraction gratings, or other wavelength-dependent reflectors or devices.

FIG. 7 illustrates an encoder 181 that comprises three wavelength-dependent couplers 183, 185, 187. The three couplers 183, 185, 187 are similar and only the coupler 183 is described. The coupler 183 comprises waveguides 189, 191 (such as optical fibers or waveguide channels in a substrate) placed in proximity to each other so that optical radiation propagating in the waveguide 191 transfers to the waveguide 189. This transfer is generally a function of wavelength so that for a selected coupling length only certain wavelengths transfer to the waveguide 189. A selected spectral component, e.g., the spectral component $\lambda_1$, is coupled from the waveguide 191 to the waveguide 189 and transmitted through a delay line 193. The coupler 185 directs the spectral component $\lambda_1$ to a waveguide 197 and directs the spectral component $\lambda_2$ to a waveguide 195. The spectral component $\lambda_2$ is transmitted by a delay line 199 and then recombined with the spectral components $\lambda_1, \lambda_2$ by the coupler 187.

FIG. 8 illustrates an encoder 201 that includes grating segments 203, 205, 207 separated by waveguide sections 215, 217 and formed in a core 209 of an optical fibers 211. An input pulse 212 is directed into an input surface 213 of the encoder 201 along an input direction and the grating segments 203, 205, 207 reflect selected spectral components $\lambda_1, \lambda_2, \lambda_3$, respectively, back to the input surface 213 along an output direction 244. The grating segments 203, 205, 207 are selected to reflect the respective selected wavelength components and the lengths of the waveguide sections. 215, 217 can be selected to achieve predetermined delays among the spectral components $\lambda_1, \lambda_2, \lambda_3$. As illustrated in FIG. 8, the spectral components $\lambda_1, \lambda_2, \lambda_3$ are reflected by grating segments 203, 205, 207, respectively, so that a coded output 220 is produced in which spectral component $\lambda_1$ exits the input surface 213 first, followed by spectral components $\lambda_2, \lambda_3$.

The encoder 201 also can serve to decode the coded output 220 if the coded output 220 is directed to an input surface 223 at the opposite end of the encoder 201. The spectral component $\lambda_1$ enters first but travels through the grating segments 205, 207 before reflecting from the grating segment 203. Therefore, the spectral component $\lambda_1$ receives a relative delay equal to the relative delay imparted to the spectral component $\lambda_3$ during encoding. The spectral component $\lambda_2$ receives a delay equal to the relative delay imparted to the spectral component $\lambda_2$ during encoding. The spectral component $\lambda_3$ receives a delay equal to the relative delay imparted to the spectral component $\lambda_1$ during encoding. As a result, a decoded output is produced that is similar to the input pulse 212.

Complex time-wavelength coding can be accomplished with a fiber grating coder having continuously varying spatial phase, period, and amplitude. By using multiperiod gratings, time-wavelength codes having multiple simultaneous spectral components can be produced. In addition to an optical delay between the wavelength components created by propagation along the length of a grating segment, grating segments can be separated by spaces having no diffracting elements, thereby adding additional delays between the spectral components.

Grating segments can be positioned to compensate (or pre-compensate) for the dispersion introduced by propagation of the time-wavelength coded output through an optical fiber. Thus, the fiber grating can function both as an encoder (decoder) and a dispersion precompensator (postcompensator). The relative delay associated with a particular frequency chip can be pre- or post-compensated by introducing a compensating shift in the position of the corresponding grating segment of the coder. The grating segments can overlap spatially even for high diffraction efficiencies for dispersion compensation.

Fiber grating coders can operate in a transmission direction. One such coder includes a broadband reflective grating segment at an output end of the coder, effectively redirecting an input bit back through the coder and producing a time-wavelength code in the forward (transmission) direction.

Many other types of TWMA encoders and decoders are possible. Generally, an encoder/decoder imparts specific temporal delays, phase shifts, and amplitudes to a predetermined set of wavelength chips, determined by a set of TW codes. For convenience, encoder/decoder temporal delays and phase shifts can be specified separately, but the specification of a temporal delay with interferometric precision is sufficient. Similarly, specification of a phase shift includes specification of a temporal delay. Generally temporal delays are much longer than the period of an optical signal while phase shifts are less than a few periods. In one embodiment, a coder separates spectral components spatially using a first diffractive device comprising uniformly spaced surface or bulk diffractive elements. Once the spectral components are spatially separated, the temporal delays, phases, and amplitude of the individual spectral components can be modified before recombining. The amplitude, phase, or temporal delay of the spectral channels can be changed with a programmable coder. Recombination is effected using a second grating device. Alternatives to surface or bulk gratings include photonic integrated circuit devices such as arrayed waveguide gratings (AWGs).

Optical signals coded and decoded according to TW codes support transmission of multiple data channels over a single fiber or other transmission medium. The optical data stream for each channel is encoded with a selected TW code bit. Multiple channels, each with different TW codings, are multiplexed (combined) into a single fiber. The data channels are demultiplexed with decoders. Threshold detection can be used at the output of each decoder to select only those of a selected channel.

FIG. 9 illustrates a two-channel optical communication system 300 that receives input pulses 303A, 303B from different data streams. The input pulses have power spectra as shown in FIG. 2. The communication system 300 includes encoders 305A, 305B that receive and encode the respective input pulses 303A, 303B, producing coded outputs 307A, 307B that are directed through a transmission medium 309 such as an optical fiber. After transmission through the transmission medium 309, decoders 311A, 311B receive the coded outputs 307A, 307B and produce decoded outputs 313A, 313B, respectively, and direct the decoded outputs 313A, 313B to respective detectors 319A, 319B. The detectors 319A, 319B include respective threshold circuits 320A, 320B that set respective detection thresholds $P_1$, $P_2$.

The encoders 305A, 305B code the input pulses 303A, 303B so that the spectral components $\lambda_1$, $\lambda_2$, $\lambda_3$ exit the encoders 305A, 305B in the order $[\lambda_1, \lambda_2, \lambda_3]$, $[\lambda_1, \lambda_3, \lambda_2]$, respectively. The encoders 305A, 305B impart relative delays to the spectral components $\lambda_1$, $\lambda_2$, $\lambda_3$ of [1,2,3], [1,3,2], respectively. For convenience, the relative delays of the spectral components $\lambda_1$, $\lambda_2$, $\lambda_3$ are written as [J, K, L], where J, K, and L are the relative delays in arbitrary units. The decoders 311A, 311B receive portions of both of the coded outputs 307A, 307B. The decoder 311A is matched to the coded output 307A, and provides relative delays of [3, 2, 1] to the spectral components $\lambda_1$, $\lambda_2$, $\lambda_3$. Combining the relative delays for the encoder 305A and the decoder 311A, the spectral components $\lambda_1$, $\lambda_2$, $\lambda_3$ of the input pulse 303A receive total relative delays of [4, 4, 4], i.e., the three spectral components receive no relative delays as a result of the encoding/decoding process. The decoder 311B is similarly matched to the coded output 307B, and provides relative delays of [3, 1, 2] to the spectral components $\lambda_1$, $\lambda_2$, $\lambda_3$. Combining the relative delays for the encoder 305B and the decoder 311B, the spectral components $\lambda_1$, $\lambda_2$, $\lambda_3$ of the input pulse 303B receive delays of [4, 4, 4], i.e., the three spectral components receive no relative delays as a result of the encoding/decoding process.

The decoders 311A, 311B also receive portions of the coded outputs 307B, 307A, respectively, that are not matched. For example, the decoder 311A provides relative delays of [3,2,1]. Acting upon the coded output 307B having relative delays of [1,3,2], the spectral components $\lambda_1$, $\lambda_2$, $\lambda_3$ exit the decoder 311A with relative delays of [4,5,3]. The decoded output 313A includes a decoded portion 315A that comprises the spectral components of the coded output 307A having no relative delays and a crosstalk portion 317A that comprises the spectral components of the coded output 307B having relative delays [4,5,3]. The decoded output 313B similarly includes a decoded portion 315B corresponding to the spectral components of the input pulse 303B with no relative delays and a crosstalk portion 317B that comprises the spectral components of the coded output 307A. The relative delays of the spectral components of the crosstalk portion 317B are [4,3,5]. The detectors 319A, 319B recover the input data from the input pulses 303A, 303B by setting the detection thresholds $P_1$, $P_2$ such that the crosstalk portions 317A, 317B are below the thresholds $P_1$, $P_2$ and are discarded. In the preceding discussion, it is assumed that the coded outputs 307A, 307B temporally overlap. However, the coded outputs 307A, 307B need not temporally overlap and temporal non-overlap of the coded outputs 307A, 307B can reduce the importance of crosstalk.

Threshold detection as described in, for example, co-pending patent application 09/132,006, incorporated herein by reference, can be used to distinguish a selected signal obtained by matched decoding and crosstalk resulting from mismatched decoding. Other types of linear, nonlinear, optical, or electronic thresholding can also be used to differentiate between matched and unmatched decoding events.

Figure 10A:
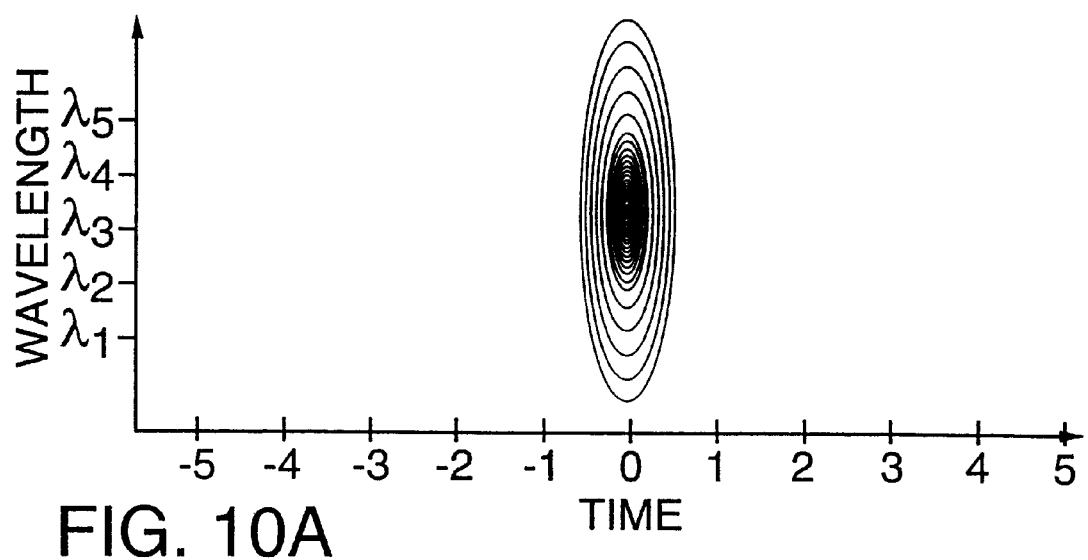
FIG. 10A is a graph of a time-wavelength spectrum of an input pulse.
Figure 10B:
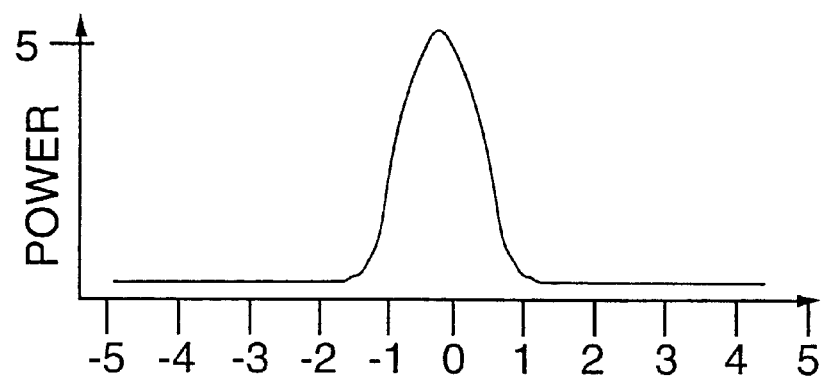
FIG. 10B is a graph of power as a function of time for the input pulse of FIG. 10A.
Figure 10C:
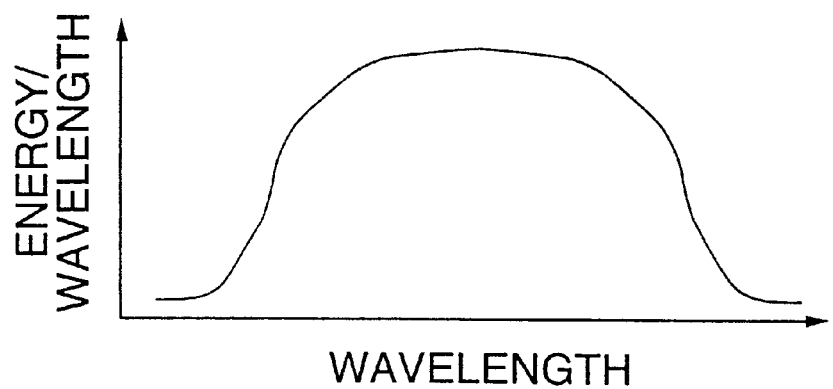
FIG. 10C is a graph of energy as a function of wavelength for the input pulse of FIG. 10A.

In the communication systems of FIGS. 1 and 9, input pulses are divided into three spectral components. Communication systems in which the input pulses are divided into two, three, or more spectral components are also possible. FIGS. 10A–10G illustrate encoding and decoding with five spectral components. FIG. 10A is a graph of a TWS of an input pulse. The magnitude of the optical power $P_\lambda(t)$ is indicated by the density of contour lines, with areas in which contour lines are more closely spaced corresponding to higher powers. FIG. 10B is a graph of input pulse power as a function of time and FIG. 10C is a graph of input energy per unit wavelength as a function of wavelength. FIGS. 10B–10C illustrate input pulse power and spectrum, but do not show the dependence of input pulse wavelength on time that is displayed in FIG. 10A.

Figure 10D:
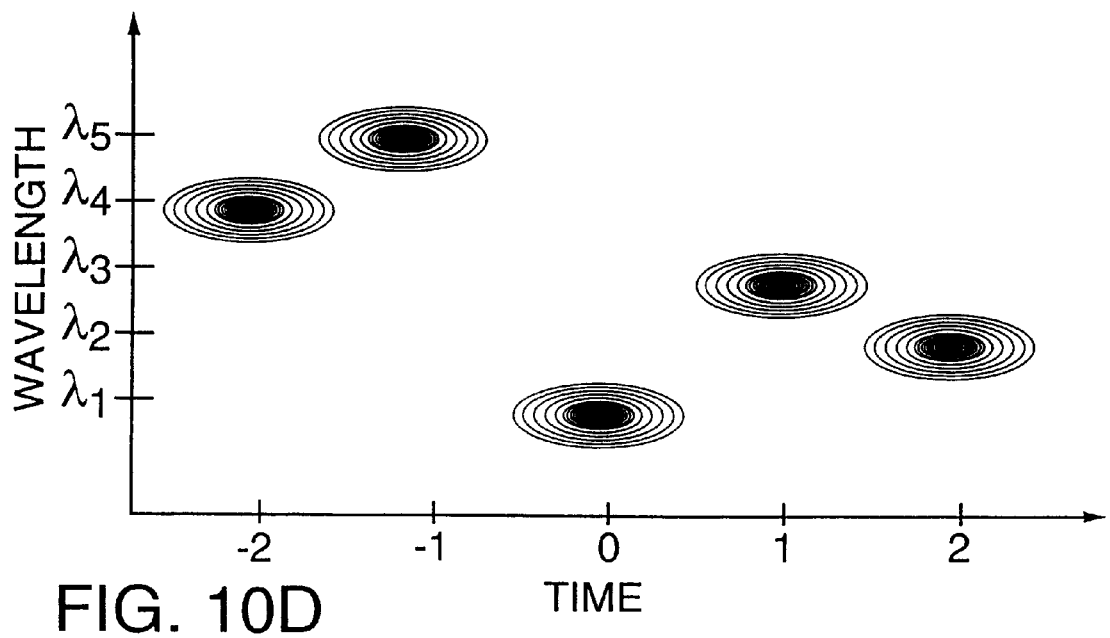
FIG. 10D is a graph of a time-wavelength spectrum of a coded output produced by encoding the input pulse of FIG. 10A.
Figure 10E:
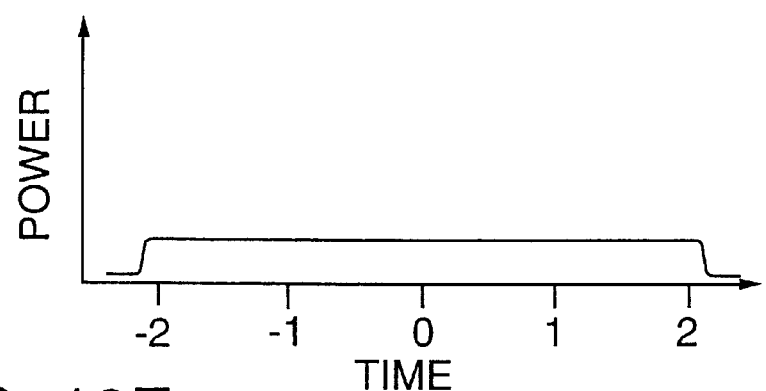
FIG. 10E is a graph of power as a function of time for the coded output of FIG. 10D.

The input pulse is encoded by applying relative delays [3, 5, 4, 1, 2] to spectral components $\lambda_1$, $\lambda_2$, $\lambda_3$, $\lambda_4$, $\lambda_5$. The coded output is shown in FIGS. 10D–10E. In FIG. 10D, the power of the coded output is shown as a function of both time and wavelength, with areas in which contour lines are more closely spaced corresponding to higher powers. FIG. 10E shows the power of the coded output as a function of time. By imposing the relative delays [3, 5, 4, 1, 2] on the input pulse, a substantially constant output power is produced.

Figure 10F:
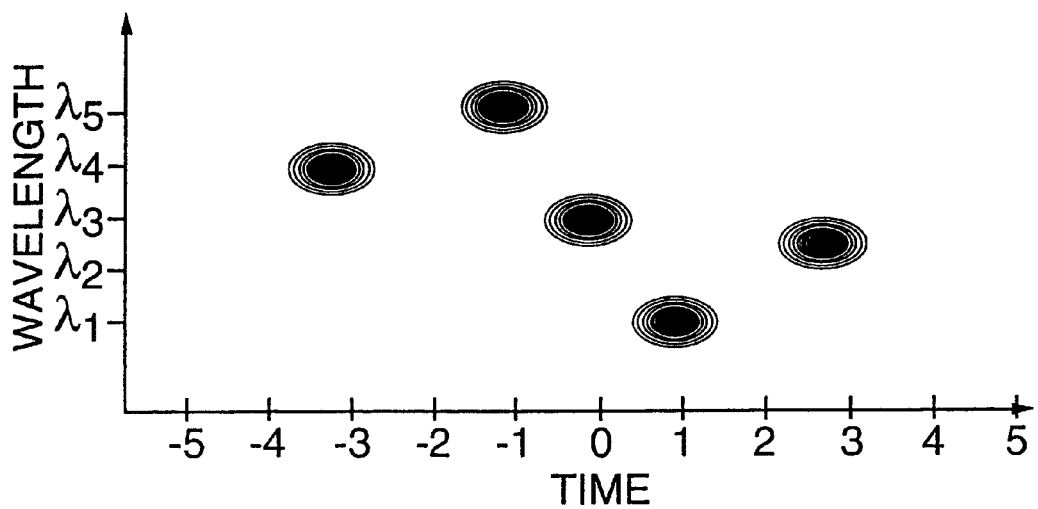
FIG. 10F is a graph of a time-wavelength spectrum of a decoded output produced by decoding the coded output of FIG. 10D with an unmatched decoder.
Figure 10G:
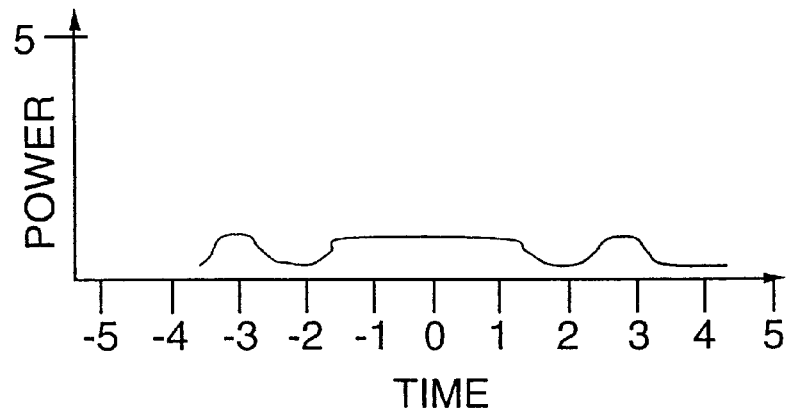
FIG. 10G is a graph of power as a function of time for the decoded output of FIG. 10F.

The coded output of FIG. 10D is decoded by imposing relative delays between the five spectral components so that the five spectral components are reassembled. A matched decoder imposes relative delays [3, 1, 2, 5, 4] and reassembles the input pulse. In a communication system using this coded output, a portion of the coded output is directed to and decoded by unmatched decoders, producing crosstalk. For example, if relative delays [4, 5, 2, 1, 3] are provided by a decoder, the crosstalk has relative delays [7, 10, 6, 2, 5]. FIGS. 10F–10G show this crosstalk as a function of time and wavelength.

Figure 11A:
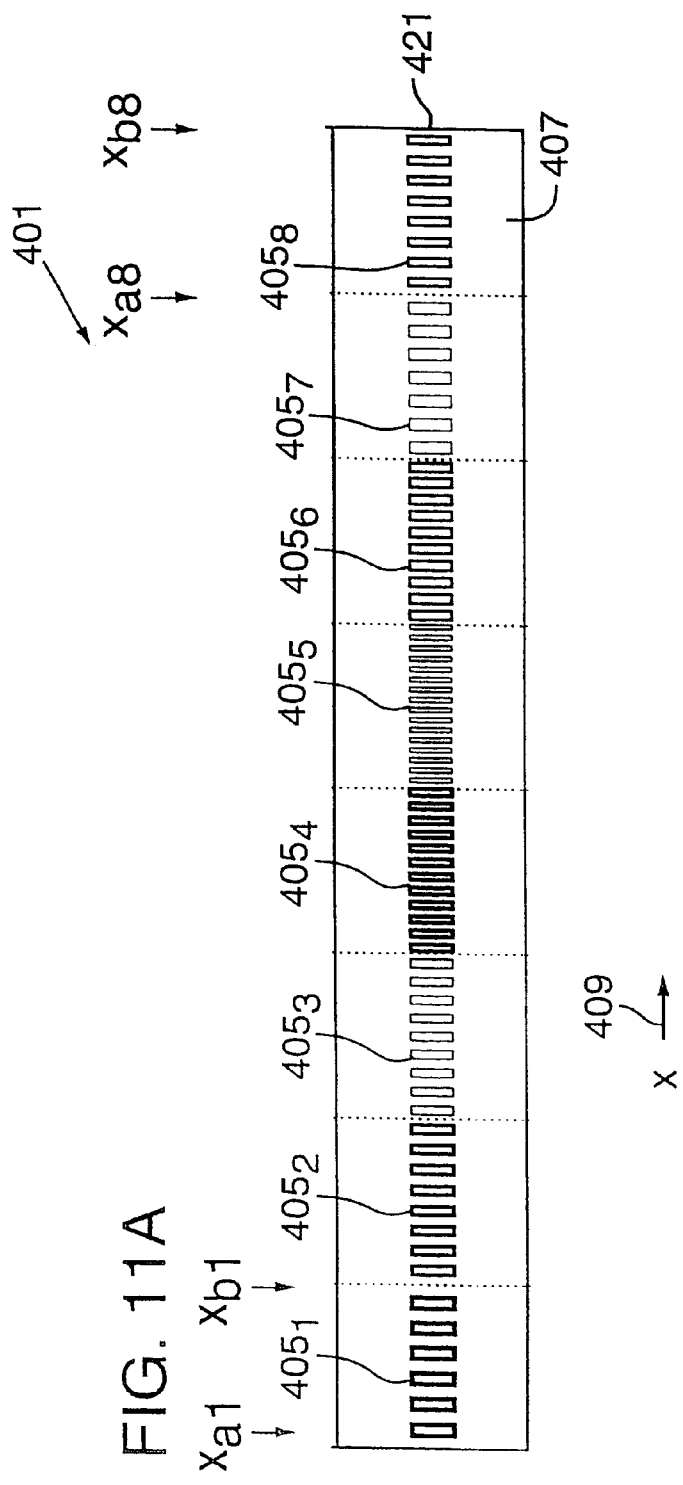
FIGS. 11A–11B are schematics of fiber Bragg grating encoders or decoders.

FIG. 11A is a schematic of an encoder 401 (or a decoder) for a communication system in which an input pulse is divided into as many as eight spectral components. The encoder 401 includes N=8 fiber Bragg grating segments 405$_i$ arranged in a core 421 and along an axis 409 of an optical fiber 407 or other waveguide. Variations in refractive index, reflectivity, absorbance, or other optical property define the grating segments 405$_i$; these variations are indicated as alternating light and dark bands in FIG. 11A. For convenience, the optical property variations in each of the grating segments 405$_i$ have a fixed period. In other embodiments, the optical property variations defining the grating segments 405$_i$ are more complex, including variations for apodization or other spectral or temporal profile shaping, as described in A. Othonos, "Fiber Bragg Gratings," *Rev. Sci. Instrum.*, vol. 68, pp. 4309–4341 (December 1997) which is incorporated herein by reference. For example, one or more of the grating segments 405$_i$ can be chirped for dispersion compensation or can be apodized to reduce spectral component overlap. In addition, the grating segments 405$_i$ need not be uniformly spaced nor have the same length. The grating segments 405$_i$ can spatially overlap. Such overlaps are included in encoders that use more complex codes in which several frequency components are partially encoded by a single grating segment. More complex gratings, such as blazed gratings, gratings with non-sinusoidal refractive index or other variations, or gratings that operate in higher orders can be used. The encoder 401 defines time chips of uniform duration, but time chips of unequal duration can also be used.

In the example encoder 401, the grating segments 405$_i$ extend from an x-coordinate $x_{ai}$ to an x-coordinate $x_{bi}$ along an x-axis 409 and have refractive-index variations of magnitude $\Delta n_i$. The total length L of the encoder 401 is $L=x_{b8}-x_{a1}$. The refractive-index variations $h_i(x)$ of each of the grating segments 405$_i$ are:

$$h_i(x)=\Delta n_i f_i(2\pi(x-x_i)/\Lambda_i) \text{ for } x_{ai} \leq x \leq x_{bi}, \text{ and} \quad (1)$$

$h_i(x)=0$ elsewhere, wherein $f_i$ is a periodic function of period $2\pi$, $|f_i| \leq \frac{1}{2}$, $x_i$ is an x-coordinate that specifies the spatial phase of the grating segment 405$_i$, and $\Lambda_i$ is the spatial period of the grating segment 405$_i$.

A complete mathematical analysis of the encoder 401 can be performed using methods described in, for example, A. Othonos, "Fiber Bragg Gratings," *Rev. Sci. Instrum.*, vol. 68, pp. 4309–4341 (December 1997). A simple analysis is presented herein, based on the assumptions that the refractive-index variations in the grating segments 405$_i$ are sinusoidal and that the grating segments 405$_i$ operate in first order. (The first-order grating operation satisfies Equation 2 below.) As mentioned above, more complex variations are possible and the simple analysis is presented for purposes of illustration.

The center wavelength $\lambda_i$ of the grating segment 405$_i$ is given by the Bragg condition for a grating of spatial period $\Lambda_i$:

$$\lambda_i=2n_o\Lambda_i, \quad (2)$$

wherein $n_o$ is the average refractive index in the fiber core 421. The reflected light receives a relative phase delay $\phi_i$ that depends on the spatial shift $x_i$ of the grating segment 405$_i$, wherein $$\phi_i=-2\pi x_i/\Lambda_i. \quad (3)$$

The reflectivity $R_i$ (the intensity-reflection coefficient or diffraction efficiency) of each of the grating segments 405$_i$ at the Bragg center wavelength $\lambda_i$ is approximately:

$$R_i=[\tan h(\pi\Delta n_i(x_{bi}-x_{ai})/\lambda_i)]^2. \quad (4)$$

For very small reflectivity ($R_i \ll 1$), Equation (4) simplifies to:

$$R_i=(\pi\Delta n_i(x_{bi}-x_{ai})/\lambda_i)^2 \quad (5)$$

The relative delays $\Delta\tau_i$ of the optical signals received from the grating segments 405$_i$ are $$\Delta\tau_i=2x_{ai}n_o/c, \quad (6)$$

where c is the vacuum speed of light. The duration of the reflected signal from a grating segment sets the duration of the corresponding time chip.

If the encoder 401 receives an input pulse of duration $\tau_p$ having spectral components that are reflected by the grating segments 405$_i$, then a coded output is produced. If the input pulse duration $\tau_p$ is shorter than propagation times $n_o(x_{bi}-x_{ai+1})/2c$ between the grating segments 405$_i$, then the coded output comprises a series of as many as N pulses, the $i^{th}$ pulse having a relative delay of $\Delta\tau_i$, a relative intensity proportional to the reflectivity $R_i$, relative phase delay of $\phi_i$, and center wavelength $\lambda_i$. After reflection by the encoder 401, the input pulse is transformed into a coded output having an approximate duration $\tau_p+\tau_p$, where $\tau_p=n_oL/c$ and $L=x_{b8}-x_{a1}$. The time interval $\tau_p$ is referred to herein as the processing time of the encoder 401. The input pulse generally includes substantial energy in spectral components at one or more of the center wavelengths $\lambda_i$ of the encoder 401.

If an input pulse thus encoded is incident upon an unmatched fiber grating decoder of length L, then the duration of the decoder output can be as long as approximately $2\tau_p+\tau_p$. If the encoder and decoder gratings are "matched", and are comprised of segments of approximate length $d=x_{bi}-x_{ai}$, then the decoded output typically contains a short, high-power pulse having a duration of less than about $\Delta\tau_p=n_od/c$. (If the input pulse is encoded/decoded coherently, the short, high-power pulse can be as short as about $\tau_p$, even if $\tau_p<\Delta\tau_p$ as is discussed below, for transform-limited or non-transform-limited pulses.)

A parameter set $\{N, \Lambda_i, \Delta n_i, x_i, x_{ai}, x_{bi}\}$ for i=1,N defines the encoder 401 and a corresponding matched decoder is defined by the parameter set $\{N, \Lambda_{N-i}, \Delta n_{N-i}, -x_{N-i}, x_{b(N-i)}, x_{a(N-i)}\}$. The parameters $\Lambda_i$, $\Delta n_i$, $x_i$, $x_{ai}$, $x_{bi}$ are defined above. Examination of the parameter sets for the encoder and decoder reveals that a matched decoder is the same as the encoder but for encoding and decoding the optical signals are directed into opposite ends of the fiber.

Figure 11B:
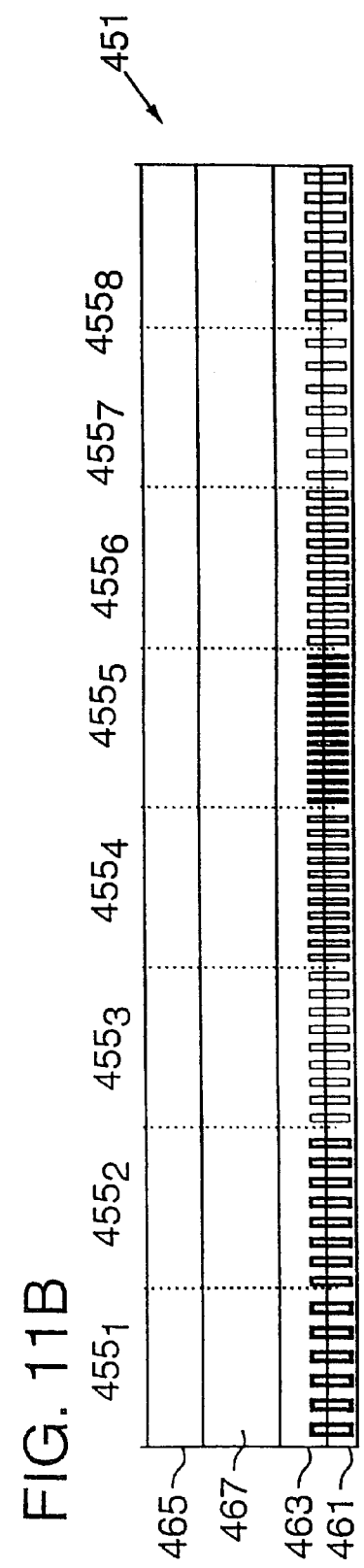

FIG. 11B is a schematic of an encoder 451 that includes N=8 grating segments $455_i$ that are defined by variations in an optical property of a coating 461 and a cladding 463 of an optical fiber 465. In alternative encoders, grating segments are defined in either a coating or a cladding of an optical fiber or other optical waveguide. In order to increase the interaction of the optical signal propagating in a core 467 of the optical fiber 465 with the coating 461, the cladding 463 can be partially or totally removed by etching, polishing, or other process.

In a TWMA communication system using codes generated by fiber grating encoders having the same bandwidth and physical length, aggregate data transfer rates ($f_a$) of less than about $$f_a = 1/(2t_p + \tau_p) \qquad (9)$$

produce minimal crosstalk between time-wavelength channels. Higher aggregate data bandwidths lead to increasing overlap between mismatched time-wavelength codes (i.e., crosstalk) at the output of an unmatched decoder. A maximum useful bandwidth, substantially in excess of $f_a$, is determined by selecting acceptable levels of crosstalk and bit-error rates. In a practical TWMA communication system, the maximum number of simultaneous channels depends on many factors, including noise in the optical signal and noise added in detection (conversion from an optical signal to an electrical signal), total bandwidth and per-channel bandwidth, acceptable bit-error rate, optical losses, time-wavelength codes selected, and whether coherent or incoherent encoders/decoders are used.

Figure 12A:
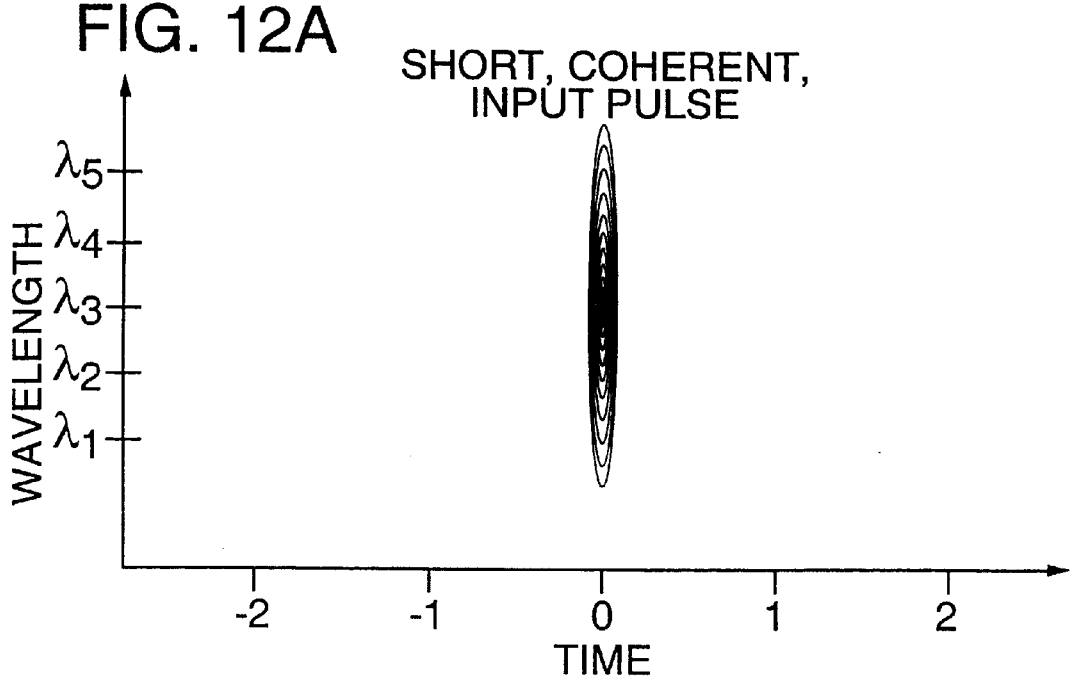
FIG. 12A is a graph of a time-wavelength spectrum of an input pulse.
Figure 12B:
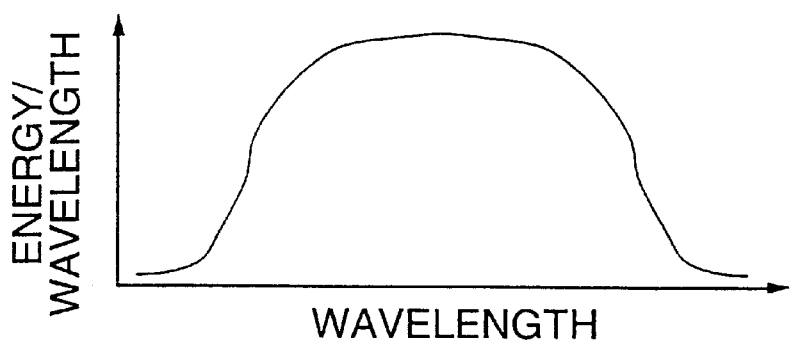
FIG. 12B is a graph of energy as a function of wavelength for the input pulse of FIG. 12A.
Figure 12C:
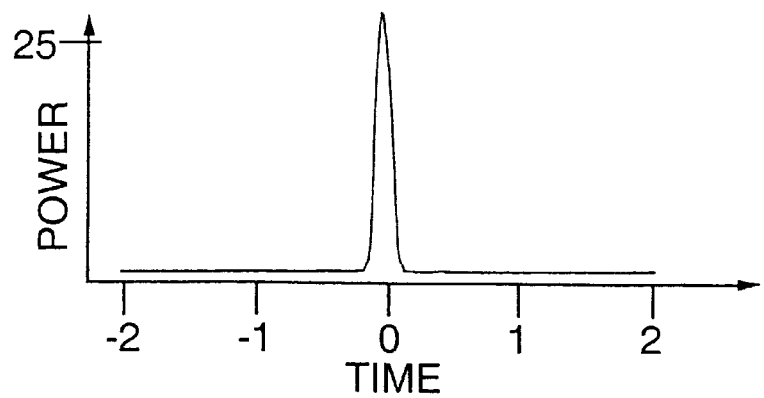
FIG. 12C is a graph of power as a function of time for the input pulse of FIG. 12A.

FIGS. 12A–12G illustrate coherent encoding and decoding with five spectral components. FIG. 12A is a graph of a TW spectrum $P_\lambda(t)$ of an input pulse. The magnitude of $P_\lambda(t)$ is indicated by contour lines, with areas having more closely spaced lines corresponding to higher powers. FIG. 12B is a graph of input pulse energy per unit wavelength as a function of wavelength, and FIG. 12C is a graph of input pulse power as a function of time. FIGS. 12B–12C illustrate input-pulse spectrum and power, but do not show the dependence of input-pulse wavelength on time that is displayed in FIG. 12A.

Figure 12D:
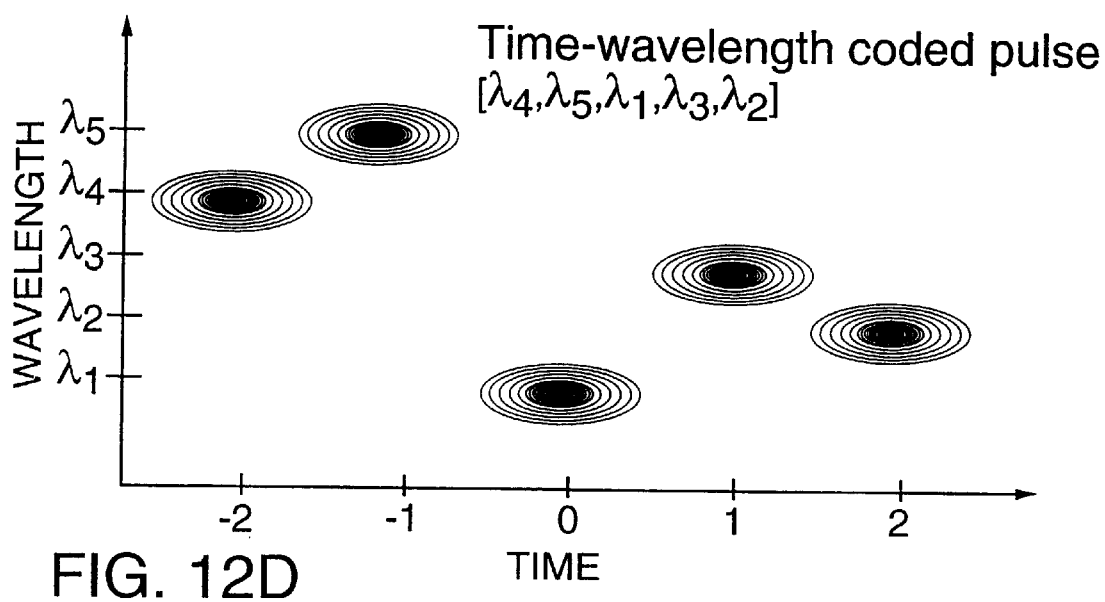
FIG. 12D is a graph of a time-wavelength spectrum of a coded output produced by encoding the input pulse of FIG. 12A.
Figure 12E:
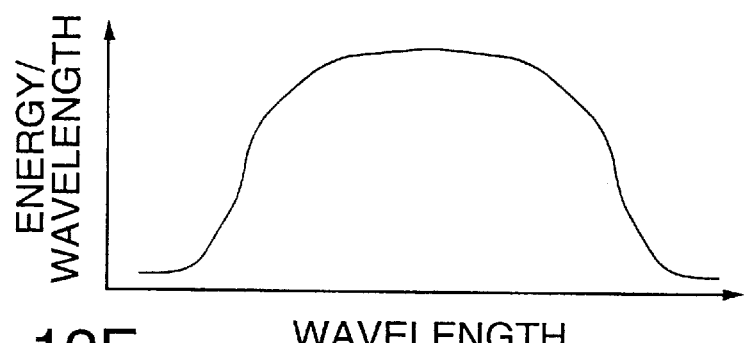
FIG. 12E is a graph of energy per unit wavelength as a function of wavelength for the coded output of FIG. 12D.
Figure 12F:
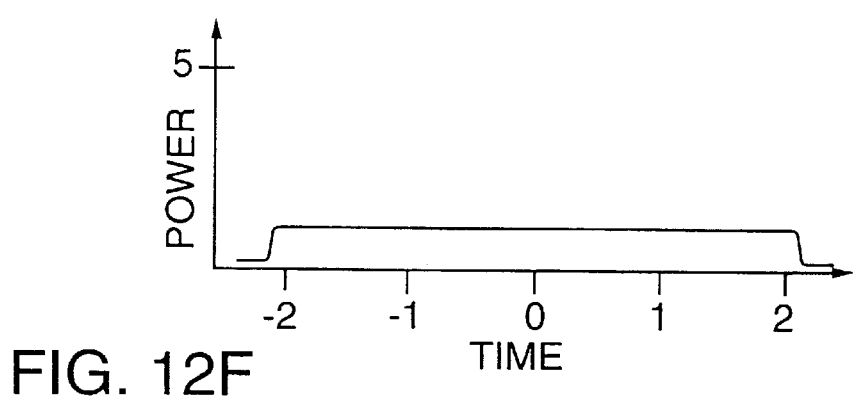
FIG. 12F is a graph of power as a function of time for the coded output of FIG. 12D.

The input pulse is encoded by applying relative delays [3, 5, 4, 1, 2] to spectral components $\lambda_1$, $\lambda_2$, $\lambda_3$, $\lambda_4$, $\lambda_5$. The coded output is shown in FIGS. 12D–12F. In FIG. 12D, the power per unit wavelength of the coded output is shown as a function of both time and wavelength, with denser contour lines corresponding to higher values. FIG. 12F shows the power of the coded output as a function of time and FIG. 12E shows the energy per unit wavelength of the coded output as a function of wavelength. By imposing the relative delays [3, 5, 4, 1, 2] on the input pulse, a substantially constant output power is produced. Referring to FIG. 12D, each of the spectral components has a temporal duration longer than the duration of the input pulse. This is a consequence of dividing a Fourier-transform-limited input pulse into spectral components. Because the spectral bandwidths of the spectral components are less than that of the input pulse, the temporal durations must be longer.

Figure 12G:
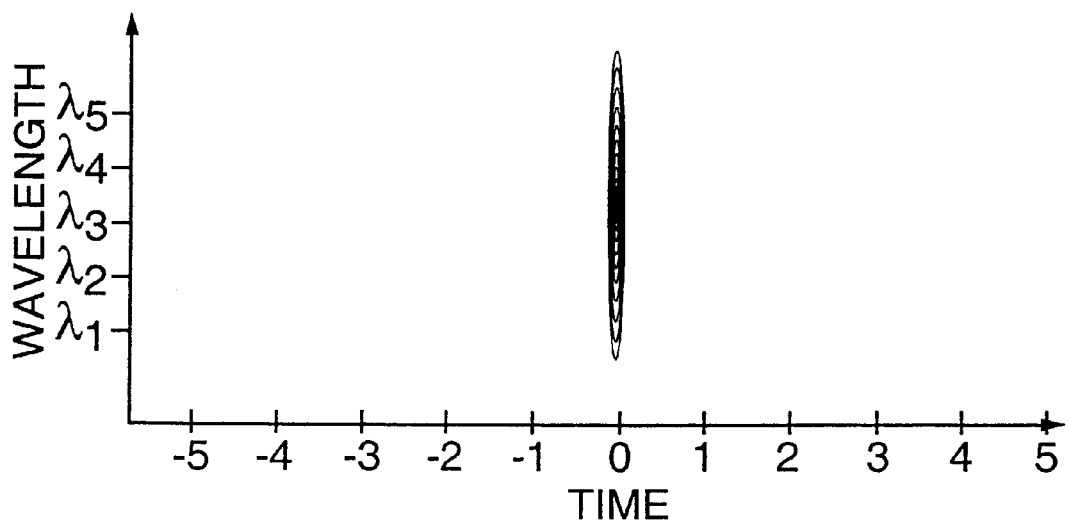
FIG. 12G is a graph of a time-wavelength spectrum of a decoded output produced by decoding the coded output of FIG. 12D with a coherently matched decoder.
Figure 12H:
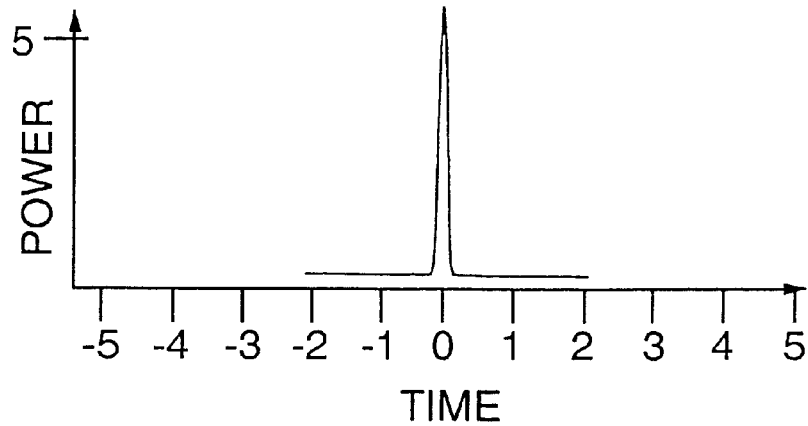
FIG. 12H is a graph of power as a function of time for the decoded output of FIG. 12G.
Figure 12I:
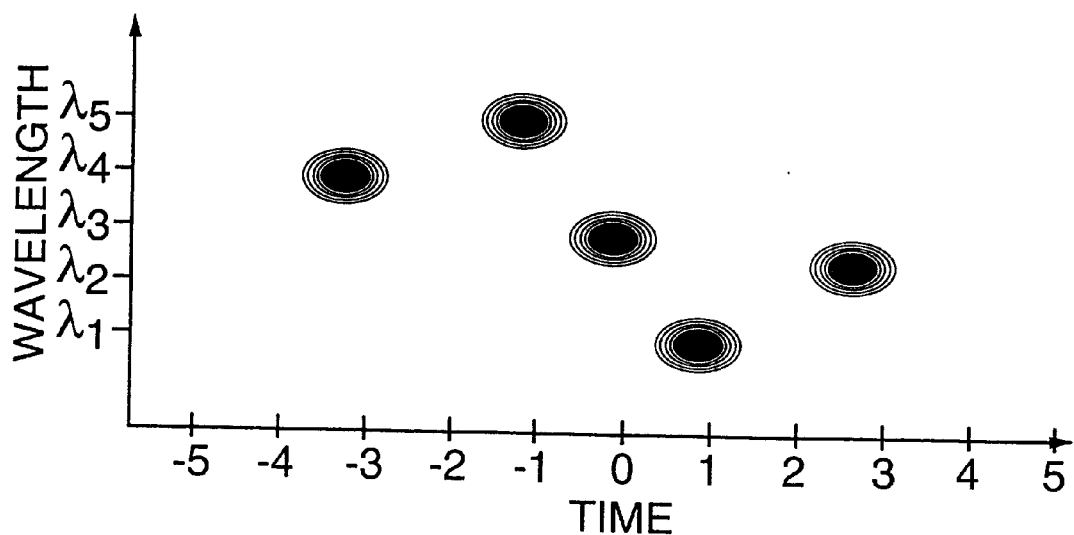
FIG. 12I is a graph of a time-wavelength spectrum of a decoded output produced by decoding the coded output of FIG. 12D with a coherently unmatched decoder.
Figure 12J:
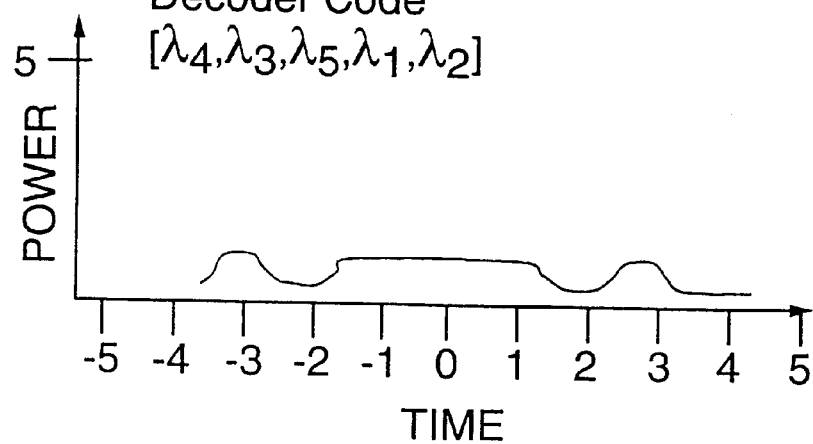
FIG. 12J is a graph of power as a function of time for the decoded output of FIG. 12I.

The coded output of FIG. 12D is decoded by imposing relative delays between the five spectral components so that the five spectral components are reassembled. A matched decoder imposes relative delays [3, 1, 2, 5, 4] and reassembles the input pulse, as shown in FIGS. 12G–12H. In a communication system using different coders and decoders for different channels, a portion of the coded output of FIG. 12D is decoded by an unmatched decoder, producing crosstalk in a communication channel. For example, if relative delays [4, 5, 2, 1, 3] are provided by a decoder, the crosstalk has relative delays [7, 10, 6, 2, 5]. FIGS. 12I–12J show this crosstalk as a function of time.

Figure 13A:
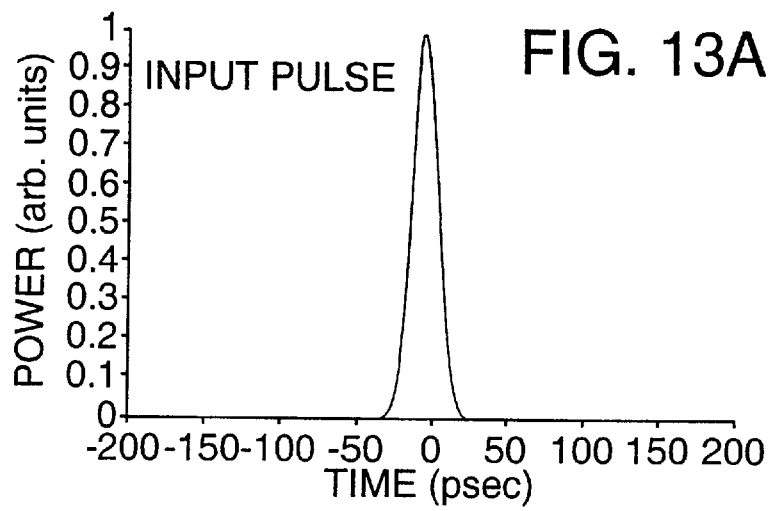
FIG. 13A–13C are graphs of optical power as a function of time for an input pulse, a decoded output obtained by decoding with controlled phase shifts, and a decoded output obtained with uncontrolled phase shifts.
Figure 13B:
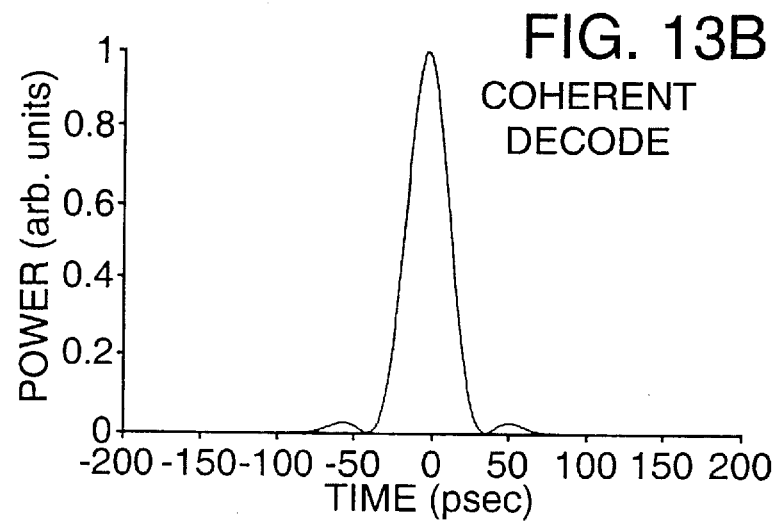
Figure 13C:
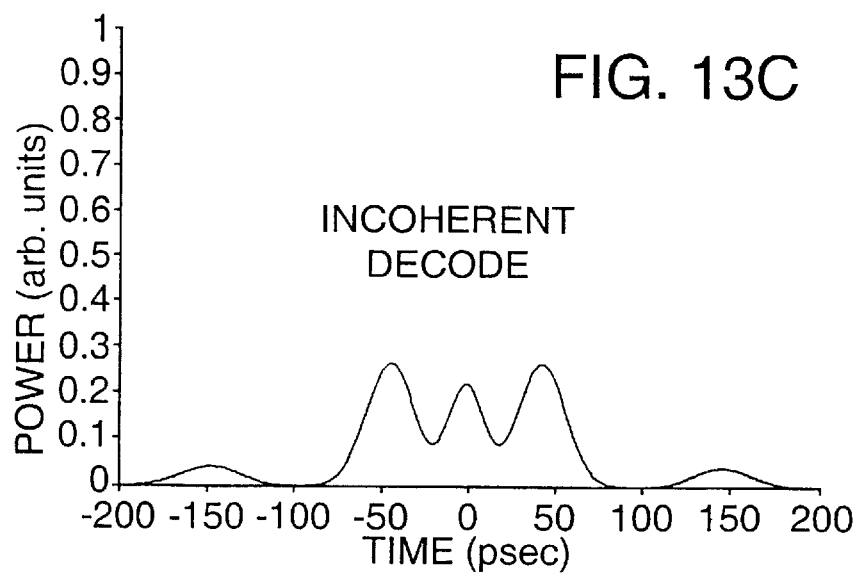

FIGS. 13A–13C illustrate a feature of coherent TWMA coding. FIG. 13A shows power as a function of time for an approximately transform-limited input pulse. FIG. 13B shows power for the encoded/decoded output pulse obtained by dividing the input pulse into three spectral components and recombining the components coherently. FIG. 13C shows power for the encoded/decoded output pulse obtained by recombining the three spectral components used to obtain the output of FIG. 13B. However, in FIG. 13C, the spectral components are recombining with phase errors of approximately $\lambda/4$. The output of FIG. 13C is very much longer than the input shown in FIG. 13A, even for such a small phase error. For coherent TWMA systems that use bandwidth-limited optical pulses, spectral components are recombined with appropriate phase relationships in order to obtain short output pulses. Similarly, for coherent TWMA systems that use non-bandwidth-limited optical pulses, the matched, coherent coding and decoding produces an output pulse of the same character as the input pulse. Since incoherent TWMA systems produce output pulses that, on average, are non-transform limited, a non-transform-limited input pulse may be used without significantly broadening the output pulse duration.

Figure 14:
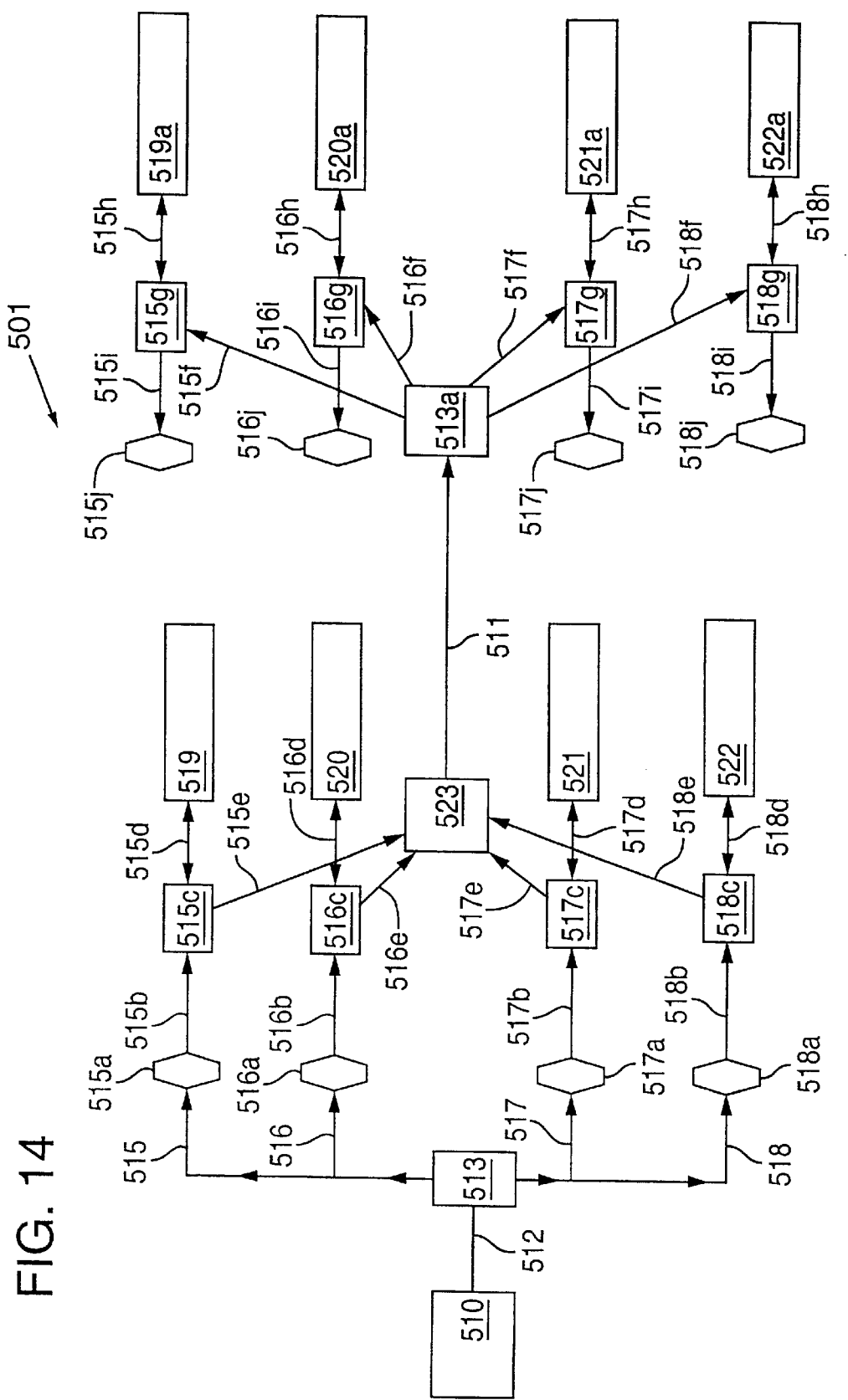
FIG. 14 is a schematic of a communication system that includes fiber Bragg grating encoders and decoders.

FIG. 14 is a schematic diagram of a TWMA communication system 501 that comprises a laser 510 (or other light source) that emits a series of pulses at a wavelength of $\lambda=1.54$ $\mu$m (frequency 194.805 THz) in a beam 512. A beamsplitter 513 divides the beam 512 into beams 515, 516, 517, 518. Modulators 515a, 516a, 517a, 518a receive respective beams 515, 516, 517, 518 and modulate the respective beams in correspondence to data streams supplied by data sources (not shown in FIG. 14). The series of pulses of modulated beams 515b, 516b, 517b, 518b are temporally and spectrally suited to respective encoders 519, 520, 521, 522, either due to the TWS of the pulses directly from the laser 510 or as modified by the respective modulators 515a, 516a, 517a, 518a. The spectral bandwidths of the beams 515b, 516b, 517b, 518b preferably include spectral components that are encoded by the encoders 519, 520, 521, 522, respectively.

The modulated beams 515b, 516b, 517b, 518b are directed through respective optical circulators 515c, 516c, 517c, 518c and through respective fibers 515d, 516d, 517d, 518d or other transmission media to the respective encoders 519, 520, 521, 522. The encoders 519, 520, 521, 522 encode respective modulated beams 515b, 516b, 517b, 518b and direct the coded outputs back through the fibers 515d, 516d, 517d, 518d. The coded outputs are directed by the respective optical circulators 515c, 516c, 517c, 518c into respective fibers 515e, 516e, 517e, 518e or other transmission media. In the communication system 501, the optical circulators 515c, 516c, 517c, 518c direct input optical signals to respective encoders and the coded outputs to respective fibers, but other devices (such as beamsplitters) can be used to separate the inputs and coded outputs. A beam combiner 523 receives the coded outputs and directs the coded outputs into an optical fiber 511 or other transmission medium, A beamsplitter or fused coupler can serve as the beam combiner 523.

After transmission through the fiber 511, an optical power splitter 513a (e.g., a beamsplitter or fused coupler) receives the combined coded outputs from the fiber 511 and forms beams 515f, 516f, 517f, 518f. Optical circulators 515g, 516g, 517g, 518g direct the respective beams 515f, 516f, 517f, 518f along respective fibers 515h, 516h, 517h, 518h to decoders 519a, 520a, 521a, 522a, respectively. The decoders 519a, 520a, 521a, 522a generate respective decoded outputs that propagate back through the respective fibers 515h, 516h, 517h, 518h to the respective optical circulators 515g, 516g, 517g, 518g and then through respective fibers 515i, 516i, 517i, 518i to respective detectors 515j, 516j, 517j, 518j that transform the decoded outputs (optical signals) into electrical signals. The detectors 515j, 516j, 517j, 518j have sufficient bandwidth to distinguish time chips. The decoded outputs include modulation corresponding to the modulation of the matched input plus crosstalk from the other data streams.

The encoders 519, 520, 521, 522 accept uncoded data streams and produce respective coded outputs. The decoders 519a, 520a, 521a, 522a accept coded data and produce respective output signals having characteristic structure whenever matching input time-wavelength codes are accepted. The decoders 519a, 520a, 521a, and 522a (preferably fiber gratings) impart respective wavelength specific time delays, phase shifts, and attenuations. The TWMA communication system 501 can be either a coherent or an incoherent system, depending on the control of the phase shifts or relative phase shifts of the encoders 519, 520, 521, 522 and the decoders 519a, 520a, 521a, 522a.

For the communication system 501, the decoders 519a, 520a, 521a, 522a are desirably segmented gratings such as shown in FIG. 11A. The grating segments have sinusoidal refractive index variations, a common index grating amplitude of $\Delta n_i = \Delta n = 1.5 \times 10^{-4}$, and a background index of refraction $n_o = 1.5$ for each segment. These values provide an approximate reflectivity of $R_i = R = 80\%$ in an operational bandwidth of the grating segment. The encoders 519a, 520a, 521a, 522a have eight contiguous grating segments (i.e., $x_{ai} = x_{bi}$), each grating segment has a length (d) of d=4 mm, and the combined length of all the grating segments is L=3.2 cm. The time interval $t_p$ of the encoders 519a, 520a, 521a, 522a is 320 ps with a time chip of $\Delta t=40$ ps. The filtering bandwidth of these encoders is $\Delta \nu = 200$ GHz=1.59 nm and the filtering bandwidth of individual grating segments is $\delta \nu = 25$ GHz=0.20 nm. There are eight adjacent wavelength chips (spectral components) with center-to-center wavelength separations of 0.20 nm. These encoders are designed for a laser wavelength of $\lambda = 1.54$ $\mu$m. The time-wavelength codes of this embodiment are so-called "full spectrum codes", i.e., they divide an optical input into equal spectral components.

The encoders 519, 520, 521, 522 are designed to accept temporally transform-limited input pulses of approximate duration $\tau_p = 2-4$ ps and generate coded outputs having a duration of about 320 ps. Longer, non-Fourier-transform-limited input pulses can be used if coded outputs of longer duration are acceptable. If the encoders 519–522 encode an input pulse having a spectral width approximately equal to the spectral width of the encoders 519–522 and a constant optical power as a function of wavelength across the spectral width, then full-spectrum coded outputs are produced, i.e., coded outputs having wavelength chips of approximately equal energies. The encoders 519–522 can be used with more complex input pulses or coded optical signals as well.

The structures of the grating segments for the encoders 519–522 and decoders 519a–522a determine the wavelength chip sequence produced. The encoders 519–522 and decoders 519a–52a have 0.20-nm wide wavelength chips and 40-ps duration time chips. Table 2 lists the parameters of the encoders 519–522. The phase shifts of the spectral components reflected by the grating segments are given relative to a reference reflected optical field at the appropriate chip wavelength, but reflected from a grating segment with $x_i = 0$.

TABLE 2

| Parameter | 519 | 520 | 521 | 522 |
|---|---|---|---|---|
| $\lambda_1$ | 1.5407 $\mu$m | 1.5399 $\mu$m | 1.5401 $\mu$m | 1.5399 $\mu$m |
| $\lambda_2$ | 1.5405 $\mu$m | 1.5397 $\mu$m | 1.5403 $\mu$m | 1.5397 $\mu$m |
| $\lambda_3$ | 1.5403 $\mu$m | 1.5395 $\mu$m | 1.5405 $\mu$m | 1.5395 $\mu$m |
| $\lambda_4$ | 1.5401 $\mu$m | 1.5393 $\mu$m | 1.5407 $\mu$m | 1.5393 $\mu$m |
| $\lambda_5$ | 1.5393 $\mu$m | 1.5401 $\mu$m | 1.5393 $\mu$m | 1.5407 $\mu$m |
| $\lambda_6$ | 1.5395 $\mu$m | 1.5403 $\mu$m | 1.5395 $\mu$m | 1.5405 $\mu$m |
| $\lambda_7$ | 1.5397 $\mu$m | 1.5405 $\mu$m | 1.5397 $\mu$m | 1.5403 $\mu$m |
| $\lambda_8$ | 1.5399 $\mu$m | 1.5407 $\mu$m | 1.5399 $\mu$m | 1.5401 $\mu$m |
| $\Lambda_1$ | 0.51356 $\mu$m | 0.51330 $\mu$m | 0.51356 $\mu$m | 0.51330 $\mu$m |
| $\Lambda_2$ | 0.51350 $\mu$m | 0.51323 $\mu$m | 0.51350 $\mu$m | 0.51323 $\mu$m |
| $\Lambda_3$ | 0.51343 $\mu$m | 0.51317 $\mu$m | 0.51343 $\mu$m | 0.51317 $\mu$m |
| $\Lambda_4$ | 0.51337 $\mu$m | 0.51310 $\mu$m | 0.51337 $\mu$m | 0.51310 $\mu$m |
| $\Lambda_5$ | 0.51310 $\mu$m | 0.51337 $\mu$m | 0.51323 $\mu$m | 0.51356 $\mu$m |
| $\Lambda_6$ | 0.51317 $\mu$m | 0.51343 $\mu$m | 0.51317 $\mu$m | 0.51350 $\mu$m |
| $\Lambda_7$ | 0.51323 $\mu$m | 0.51350 $\mu$m | 0.51350 $\mu$m | 0.51343 $\mu$m |
| $\Lambda_8$ | 0.51330 $\mu$m | 0.51356 $\mu$m | 0.51350 $\mu$m | 0.51337 $\mu$m |
| $x_1$ | 0.128 $\mu$m | 0.0 $\mu$m | 0.0 $\mu$m | −0.256 $\mu$m |
| $x_2$ | −0.128 $\mu$m | 0.0 $\mu$m | 0.0 $\mu$m | 0.0 $\mu$m |
| $x_3$ | 0.128 $\mu$m | 0.0 $\mu$m | 0.0 $\mu$m | −0.256 $\mu$m |
| $x_4$ | −0.128 $\mu$m | 0.0 $\mu$m | 0.0 $\mu$m | 0.0 $\mu$m |
| $x_5$ | 0.0 $\mu$m | 0.128 $\mu$m | −0.256 $\mu$m | 0.0 $\mu$m |
| $x_6$ | 0.0 $\mu$m | −0.128 $\mu$m | 0.0 $\mu$m | 0.0 $\mu$m |
| $x_7$ | 0.0 $\mu$m | 0.128 $\mu$m | −0.256 $\mu$m | 0.0 $\mu$m |
| $x_8$ | 0.0 $\mu$m | −0.128 $\mu$m | 0.0 $\mu$m | 0.0 $\mu$m |
| $\phi_1$ | −$\pi$/2 | 0 | 0 | $\pi$ |
| $\phi_2$ | $\pi$/2 | 0 | 0 | 0 |
| $\phi_3$ | −$\pi$/2 | 0 | 0 | $\pi$ |
| $\phi_4$ | $\pi$/2 | 0 | 0 | 0 |
| $\phi_5$ | 0 | −$\pi$/2 | $\pi$ | 0 |
| $\phi_6$ | 0 | $\pi$/2 | 0 | 0 |
| $\phi_7$ | 0 | −$\pi$/2 | $\pi$ | 0 |
| $\phi_8$ | 0 | $\pi$/2 | 0 | 0 |

The decoders 519a–522a are similar to the encoders 519–522, respectively, but with the spatial sequence of the grating segments reversed. In the analysis of an encoder using a fiber Bragg grating segment, this reversal is equivalent to changing the refractive-index variation $h_i(x)$ in Eq. (1) to $h_i(-x)$. For example, the decoder 519a is the same as the encoder 519, but the input of the encoder 519 is used as the output of the decoder 519a. For more complex codings, such as those required for dispersion compensation or code conversion, coders and decoders are not so simply related. Representative parameters of the decoders 519a–522a are listed in Table 3.

TABLE 3

| Parameter | 519a | 520a | 521a | 522a |
|---|---|---|---|---|
| $\lambda_1$ | 1.5399 $\mu$m | 1.5407 $\mu$m | 1.5399 $\mu$m | 1.5401 $\mu$m |
| $\lambda_2$ | 1.5397 $\mu$m | 1.5405 $\mu$m | 1.5397 $\mu$m | 1.5403 $\mu$m |
| $\lambda_3$ | 1.5395 $\mu$m | 1.5403 $\mu$m | 1.5395 $\mu$m | 1.5405 $\mu$m |
| $\lambda_4$ | 1.5393 $\mu$m | 1.5401 $\mu$m | 1.5393 $\mu$m | 1.5407 $\mu$m |
| $\lambda_5$ | 1.5401 $\mu$m | 1.5393 $\mu$m | 1.5407 $\mu$m | 1.5393 $\mu$m |
| $\lambda_6$ | 1.5403 $\mu$m | 1.5395 $\mu$m | 1.5405 $\mu$m | 1.5395 $\mu$m |

TABLE 3-continued

| Parameter | 519a | 520a | 521a | 522a |
|---|---|---|---|---|
| $\lambda_7$ | 1.5405 μm | 1.5397 μm | 1.5403 μm | 1.5397 μm |
| $\lambda_8$ | 1.5407 μm | 1.5399 μm | 1.5401 μm | 1.5399 μm |
| $\Lambda_1$ | 0.51330 μm | 0.51356 μm | 0.51330 μm | 0.51337 μm |
| $\Lambda_2$ | 0.51323 μm | 0.51350 μm | 0.51323 μm | 0.51343 μm |
| $\Lambda_3$ | 0.51317 μm | 0.51343 μm | 0.51317 μm | 0.51350 μm |
| $\Lambda_4$ | 0.51310 μm | 0.51337 μm | 0.51310 μm | 0.51356 μm |
| $\Lambda_5$ | 0.51337 μm | 0.51310 μm | 0.51356 μm | 0.51310 μm |
| $\Lambda_6$ | 0.51343 μm | 0.51317 μm | 0.51350 μm | 0.51317 μm |
| $\Lambda_7$ | 0.51350 μm | 0.51323 μm | 0.51343 μm | 0.51323 μm |
| $\Lambda_8$ | 0.51356 μm | 0.51330 μm | 0.51337 μm | 0.51330 μm |
| $x_1$ | 0.0 μm | 0.128 μm | 0.0 μm | −0.0 μm |
| $x_2$ | 0.0 μm | −0.128 μm | 0.256 μm | 0.0 μm |
| $x_3$ | 0.0 μm | 0.128 μm | 0.0 μm | −0.0 μm |
| $x_4$ | 0.0 μm | −0.128 μm | 0.256 μm | 0.0 μm |
| $x_5$ | 0.128 μm | 0.0 μm | 0.0 μm | 0.0 μm |
| $x_6$ | −0.128 μm | 0.0 μm | 0.0 μm | 0.256 μm |
| $x_7$ | 0.128 μm | 0.0 μm | 0.0 μm | 0.0 μm |
| $x_8$ | −0.128 μm | 0.0 μm | 0.0 μm | 0.256 μm |
| $\phi_1$ | 0 | −π/2 | 0 | 0 |
| $\phi_2$ | 0 | π/2 | −π | 0 |
| $\phi_3$ | 0 | −π/2 | 0 | 0 |
| $\phi_4$ | 0 | π/2 | −π | 0 |
| $\phi_5$ | −π/2 | 0 | 0 | 0 |
| $\phi_6$ | π/2 | 0 | 0 | −π |
| $\phi_7$ | −π/2 | 0 | 0 | 0 |
| $\phi_8$ | π/2 | 0 | 0 | −π |

For matched decoding, the decoded outputs from decoders 519a, 520a, 521a, 522a approximately duplicate the original input pulses. Fourier-transform-limited pulses will have durations between approximately 2 ps to 4 ps. Such pulse durations produce low crosstalk. Detectors with longer temporal responses can be used if more crosstalk can be tolerated, or if a longer, non-Fourier-transform-limited input pulse is used, producing a longer output pulse for matched decoding. In addition, nonlinear detection can be used to increase the contrast between the desired decoded signal and crosstalk, especially for slower detectors.

Referring further to FIG. 14, the communication system 501 also serves as an incoherent communication system as defined previously. Such an incoherent communication system is similar to the coherent system discussed previously except for the encoders 519–522, the decoders 519a–522a, and the detectors 515j, 516j, 517j, 518j. By way of example, the encoders 519–522 and decoders 519a–522a have sinusoidal refractive-index variations with amplitude $\Delta n_r = \Delta n = 6.0 \times 10^{-4}$, and $n_o = 1.5$. With these parameters, the reflectance of each grating segment is nearly 100% for the corresponding wavelength chip (spectral component). The fiber gratings have eight contiguous ($x_{ai} = x_{b(N-1)}$) grating segments, each grating having a length d=12.5 mm, so that the total grating length L=10.0 cm. The processing time of these encoders/decoders is $t_p$=1ns with a temporal chip time of 125 ps. The overall bandwidth of the encoders/decoders is 9.1 nm and each grating segment has a bandwidth of 0.63 nm. There are eight adjacent 1.2-nm wavelength chips with wavelength spacing equal to 1.2 nm. The encoders/decoders are designed for optical data streams having a central frequency of 194.805 THz (wavelength λ=1.54 pm).

The encoders 519, 520, 521, 522 are designed to accept input optical pulses having pulse durations in the range of 1 ps to 125 ps, more preferably in the range 50 ps to 100 ps. A matched incoherent decoder does not produce substantially shorter output pulses for input pulses having shorter durations. The encoders 519–522 and decoders 519a–522a are preferably used with an input data rate ($f_{rep}$) that is less than about $f_{rep}$=500 Mbit/sec so that temporally adjacent bits are well separated after coding to reduce crosstalk. Input data rates be higher, in the range from 500 Mbit/sec to about 10 Gbit/sec, if higher levels of stalk are acceptable.

Representative parameters of the encoders 519, 520, 521, 522 in the incoherent embodiment are listed in Table 4.

TABLE 4

| Parameter | 519 | 520 | 521 | 522 |
|---|---|---|---|---|
| $\lambda_1$ | 1.5394 μm | 1.5406 μm | 1.5442 μm | 1.5394 μm |
| $\lambda_2$ | 1.5442 μm | 1.5382 μm | 1.5430 μm | 1.5382 μm |
| $\lambda_3$ | 1.5359 μm | 1.5418 μm | 1.5418 μm | 1.5370 μm |
| $\lambda_4$ | 1.5430 μm | 1.5370 μm | 1.5406 μm | 1.5359 μm |
| $\lambda_5$ | 1.5370 μm | 1.5430 μm | 1.5359 μm | 1.5406 μm |
| $\lambda_6$ | 1.5418 μm | 1.5359 μm | 1.5370 μm | 1.5418 μm |
| $\lambda_7$ | 1.5382 μm | 1.5442 μm | 1.5382 μm | 1.5430 μm |
| $\lambda_8$ | 1.5406 μm | 1.5394 μm | 1.5394 μm | 1.5442 μm |
| $\Lambda_1$ | 0.51314 μm | 0.51353 μm | 0.51472 μm | 0.51314 μm |
| $\Lambda_2$ | 0.51472 μm | 0.51274 μm | 0.51432 μm | 0.51274 μm |
| $\Lambda_3$ | 0.51195 μm | 0.51393 μm | 0.51393 μm | 0.51235 μm |
| $\Lambda_4$ | 0.51432 μm | 0.51235 μm | 0.51353 μm | 0.51195 μm |
| $\Lambda_5$ | 0.51235 μm | 0.51432 μm | 0.51195 μm | 0.51353 μm |
| $\Lambda_6$ | 0.51393 μm | 0.51195 μm | 0.51235 μm | 0.51393 μm |
| $\Lambda_7$ | 0.51274 μm | 0.51472 μm | 0.51274 μm | 0.51432 μm |
| $\Lambda_8$ | 0.51353 μm | 0.51314 μm | 0.51314 μm | 0.51472 μm |

The coded outputs are decoded by decoders 519a–522a that are similar to the encoders 519–522 but reversed as discussed above. The grating segment spatial shifts $x_i$, and hence $\phi_i$, are not controlled. Representative parameters of the incoherent decoders 519a–522a are listed in Table 5.

TABLE 5

| Parameter | 519a | 520a | 521a | 522a |
|---|---|---|---|---|
| $\lambda_1$ | 1.5406 μm | 1.5394 μm | 1.5394 μm | 1.5442 μm |
| $\lambda_2$ | 1.5382 μm | 1.5442 μm | 1.5382 μm | 1.5430 μm |
| $\lambda_3$ | 1.5418 μm | 1.5359 μm | 1.5370 μm | 1.5418 μm |
| $\lambda_4$ | 1.5370 μm | 1.5430 μm | 1.5359 μm | 1.5406 μm |
| $\lambda_5$ | 1.5430 μm | 1.5370 μm | 1.5406 μm | 1.5359 μm |
| $\lambda_6$ | 1.5359 μm | 1.5418 μm | 1.5418 μm | 1.5370 μm |
| $\lambda_7$ | 1.5442 μm | 1.5382 μm | 1.5430 μm | 1.5382 μm |
| $\lambda_8$ | 1.5394 μm | 1.5406 μm | 1.5442 μm | 1.5394 μm |
| $\Lambda_1$ | 0.51353 μm | 0.51314 μm | 0.51314 μm | 0.51472 μm |
| $\Lambda_2$ | 0.51274 μm | 0.51472 μm | 0.51274 μm | 0.51432 μm |
| $\Lambda_3$ | 0.51393 μm | 0.51195 μm | 0.51235 μm | 0.51393 μm |
| $\Lambda_4$ | 0.51235 μm | 0.51432 μm | 0.51195 μm | 0.51353 μm |
| $\Lambda_5$ | 0.51432 μm | 0.51235 μm | 0.51353 μm | 0.51195 μm |
| $\Lambda_6$ | 0.51195 μm | 0.51393 μm | 0.51393 μm | 0.51235 μm |
| $\Lambda_7$ | 0.51472 μm | 0.51274 μm | 0.51432 μm | 0.51274 μm |
| $\Lambda_8$ | 0.51314 μm | 0.51353 μm | 0.51472 μm | 0.51314 μm |

By way of example, each of the decoders 519a–522a produces an output pulse of approximately 125 ps duration from a matched input. The temporal response of each of the detectors 515j–518j is preferably less than or comparable to $\tau_p$=125 ps. Detectors having still longer response times can be used but tend to decrease channel contrast. Nonlinear detection can be used to increase the contrast between the signal and crosstalk.

The TW codes used in the embodiments described above have little or no temporal overlap and each time chip contains a single spectral component. More generally, however, a time chip can include several spectral components. An example of such a code is denoted by a wavelength sequence such as [($\lambda_1:\lambda_2$), $\lambda_4$, $\lambda_2$, ($\lambda_3:\lambda_4$), $\lambda_5$], indicating spectral components for the time chips. The second, third, and fifth time chips contain only a single spectral component ($\lambda_4$, $\lambda_2$, $\lambda_5$, respectively) while each of the first and fourth time chips contains two wavelengths, ($\lambda_1:\lambda_2$) and ($\lambda_3:\lambda_4$), respectively.

The peak power of an incoherently decoded bit depends in detail on the phase errors introduced into each spectral component by the incoherent encoding/decoding process. In a limiting condition characterized by large numbers of equal amplitude time chips, random phase errors, and transform-limited input bits, incoherent decoding provides peak output powers reduced by N in comparison with coherent coding, where N is the number of time-wavelength chips. Although coherent coding provides superior contrast than incoherent coding in the case of near Fourier-transform-limited input pulses, for some applications, coherent coders generally are unsuitable because of the substantially higher manufacturing cost incurred to provide interferometric phase accuracy. Furthermore, incoherent coding allows for the use of longer non-Fourier-transform-limited input pulses without significant performance degradation. Peak power contrast for matched versus unmatched decoding generally can be improved using time-wavelength codes having large numbers of time chips.

Figure 15A:
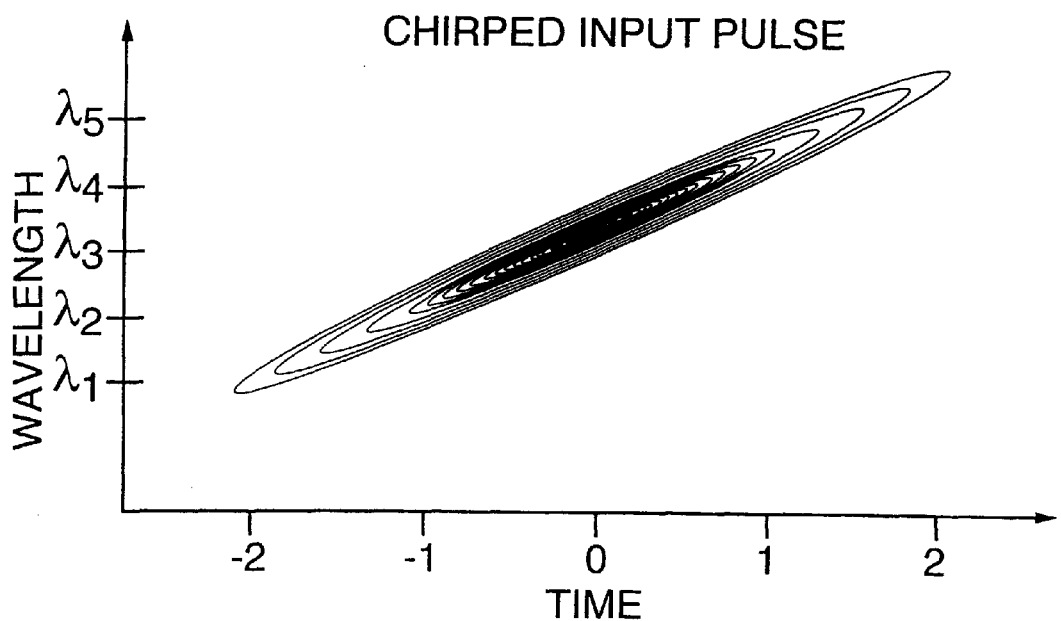
FIG. 15A shows the time-wavelength spectrum of a chirped pulse.
Figure 15B:
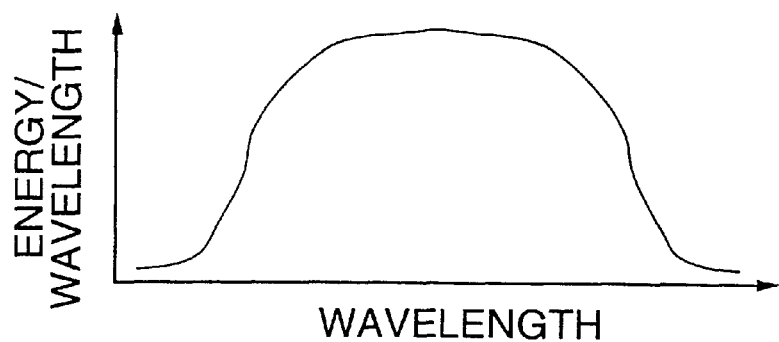
FIG. 15B is a graph of energy as a function of wavelength for the chirped pulse of FIG. 15A.
Figure 15C:
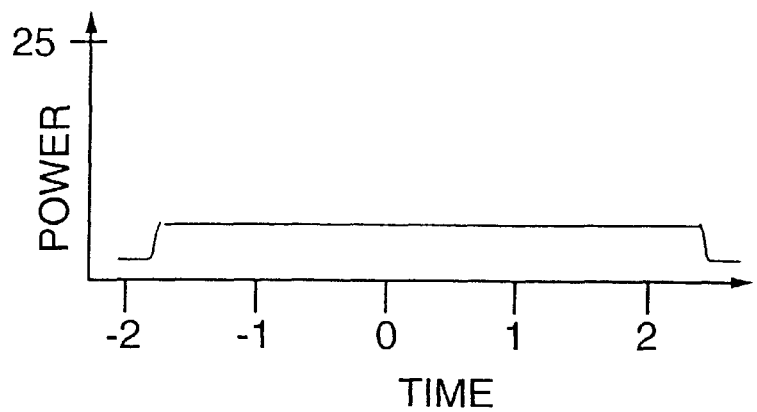
FIG. 15C is a graph of power as a function of time for the chirped pulse of FIG. 15A.

FIGS. 15A–15C illustrate the time-wavelength spectra of a chirped input pulse. Such an input pulse can be TWMA-encoded resulting in TWS shown in FIG. 15D. Other input pulses can be coded and decoded, such as those containing two or more non-adjacent spectral components, such as spectral components corresponding to longitudinal modes of a laser diode.

The example encoders and decoders described above encode or decode, respectively, a predetermined code that is defined by the structure of the encoders and decoders. Encoders and decoders also can be dynamically reprogrammable to encode and decode, respectively, various codes. The encoding and decoding produced by a fiber Bragg encoder (such as shown in FIG. 11) is determined by the parameters $\Delta n_i$, $x_i$, $x_{ai}$, $x_{bi}$, $\Lambda_i$ of the grating segments. Dynamic control of any of these parameters enables dynamic reprogramming of such an encoder or decoder. For example, $x_i$ and $\Lambda_i$ are adjustable by adjusting fiber index of refraction or fiber length. The index of refraction can be controlled with, for example, an electric field, pressure, current, temperature, or optical irradiation. A fiber grating may also be created within a system that has spatially localized stretching or compression of the fiber length, thereby changing a combination of $x_{ai}$, $x_{bi}$, $x_i$, and $\Lambda_i$ in a way that is determined by the geometry of the system.

Although embodiments of the invention are described above with reference to digital communication, it should be understood that TWMA methods and apparatus according to the invention are also suitable for analog communication as well. In addition, TWMA methods and apparatus can be used in conjunction with conventional WDM and TDM systems. For example, coding and encoding can be used with the wavelength channels of a WDM system.

In addition, various network algorithms can specify encoding and decoding. For example, when a data stream is delivered to a network node, the network node can request a TWMA channel assignment. A network control node then assigns codes to the data stream. When the data stream is removed from that network node, the codes then become available for assignment to other nodes in a manner similar to that of radio-frequency CDMA networks.

While the invention has been described with reference to example embodiments, it will be understood by those skilled in the art that various changes in format and detail may be made without departing from the spirit and scope of the invention.

We claim:

1. A time-wavelength coder for coding an optical signal having a plurality of spectral components, comprising:
    a plurality of optical paths corresponding to the spectral components, the optical paths having respective path lengths selected to produce predetermined delays among the spectral components;
    a beam divider situated to direct the spectral components along the respective optical paths; and
    a beam combiner situated to receive the spectral components after the spectral components propagate along respective optical paths, wherein the path lengths are predetermined by a time-wavelength code to less than $\lambda/2$, wherein $\lambda$ is a mean wavelength of the spectral component received by a respective optical path.

2. The coder of claim 1, wherein the path lengths are predetermined to convert an optical signal having a time-wavelength spectrum determined by a first time-wavelength code into an output signal having a time-wavelength spectrum determined by a second time-wavelength code.

3. The coder of claim 1, wherein the path lengths are selected to compensate for dispersion in a transmission medium.

4. A time-wavelength coder for coding an optical signal having a plurality of spectral components, comprising:
    a plurality of optical paths corresponding to the spectral components, the optical paths having respective path lengths selected to produce predetermined delays among the spectral components to convert an optical signal having a time-wavelength spectrum determined by a first time-wavelength code into an output signal having a time-wavelength spectrum determined by a second time-wavelength code, wherein the path lengths are predetermined to less than $\lambda/2$, wherein $\lambda$ is a mean wavelength of the spectral component received by a respective optical path;
    a beam divider situated to direct the spectral components along the respective optical paths; and
    a beam combiner situated to receive the spectral components after the spectral components propagate along respective optical paths.

5. The coder of claim 4, wherein the path lengths are selected to compensate for dispersion in a transmission medium.

6. The coder of claim 5, wherein the transmission medium is an optical fiber.

7. A code converter for converting an input optical signal having a time-wavelength spectrum determined by an input time-wavelength code into a coded output having a time-wavelength spectrum determined by an output code, the code converter comprising:
    an optical fiber that includes a plurality of fiber Bragg gratings; and
    a plurality of optical paths defined by the fiber Bragg gratings, the optical paths having respective path lengths determined by the time-wavelength spectrum of the input and output codes, wherein the path lengths are determined to less than $\lambda/2$, wherein $\lambda$ is a mean wavelength of the spectral component received by a respective optical path.

8. A time-wavelength coder that receives an input optical signal having a first predetermined time-wavelength spectrum and generates an output signal having a second predetermined time-wavelength spectrum, each of the first and second predetermined time-wavelength spectra including a plurality of spectral components, the coder comprising an optical fiber that includes a plurality of fiber Bragg gratings defined by spatial variations of an optical property of the fiber, the spatial variations providing predetermined time-delays for the spectral components, wherein the spatial variations provide predetermined phase differences for the spectral components and the predetermined phase differences are predetermined to within about one-half of a wavelength of the associated spectral component.

9. The time-wavelength coder of claim 8, wherein the time-delays are predetermined according to a time-wavelength code.

10. The time-wavelength coder of claim 8, wherein the spatial variations in an optical property of the fiber include variations in at least one of amplitude, spatial period, and spatial phase of the optical property.

11. The time-wavelength coder of claim 10, wherein the optical fiber comprises a cladding and a coating for the cladding, and the Bragg gratings are defined by spatial variations in the refractive index of the coating.

12. The time-wavelength coder of claim 10, wherein the optical fiber comprises a cladding and a coating for the cladding, and the Bragg gratings are defined by spatial variations in the transmittance of the coating.

13. The time-wavelength coder of claim 8, wherein the optical property of the fiber defining the Bragg gratings is refractive index.

14. The time-wavelength coder of claim 13, wherein the optical fiber comprises a core and a cladding, and the Bragg gratings are defined by spatial variations in the refractive index of the core.

15. The time-wavelength coder of claim 13, wherein the optical fiber comprises a core and a cladding, and the Bragg gratings are defined by spatial variations in the refractive index of the cladding.

16. The coder of claim 8, wherein the path lengths are selected to compensate for dispersion in a transmission medium.

* * * * *

UNITED STATES PATENT AND TRADEMARK OFFICE
CERTIFICATE OF CORRECTION

PATENT NO. : 6,292,282 B1
DATED : September 18, 2001
INVENTOR(S) : Mossberg et al.

It is certified that error appears in the above-identified patent and that said Letters Patent is hereby corrected as shown below:

Column 17,
Line 47, delete "$n_{0=}1.5$", insert -- $n_0=1.5$ --.
Line 53, delete "$t_p=ins$", insert -- $t_p= 1$ ns --.

Signed and Sealed this

Seventh Day of January, 2003

JAMES E. ROGAN
*Director of the United States Patent and Trademark Office*